United States Patent
Kamiyoshihara

(10) Patent No.: US 9,274,370 B2
(45) Date of Patent: Mar. 1, 2016

(54) LIGHT-EMITTING DEVICE, BACKLIGHT DEVICE, AND IMAGE DISPLAY APPARATUS

(71) Applicant: CANON KABUSHIKI KAISHA, Tokyo (JP)

(72) Inventor: Masahiro Kamiyoshihara, Kamakura (JP)

(73) Assignee: Canon Kabushiki Kaisha, Tokyo (JP)

(*) Notice: Subject to any disclaimer, the term of this patent is extended or adjusted under 35 U.S.C. 154(b) by 103 days.

(21) Appl. No.: 14/275,207

(22) Filed: May 12, 2014

(65) Prior Publication Data

US 2014/0340614 A1    Nov. 20, 2014

(30) Foreign Application Priority Data

May 14, 2013 (JP) ................................. 2013-102245
Apr. 16, 2014 (JP) ................................. 2014-084941

(51) Int. Cl.
  *G02F 1/1335* (2006.01)

(52) U.S. Cl.
  CPC ........ *G02F 1/1336* (2013.01); *G02F 1/133603* (2013.01); *G02F 1/133604* (2013.01); *G02F 1/133605* (2013.01); *G02F 1/133611* (2013.01)

(58) Field of Classification Search
  CPC ..................... G02F 1/133605; G02F 1/133604
  See application file for complete search history.

(56) References Cited

FOREIGN PATENT DOCUMENTS

| JP | 2006-196456 A | 7/2006 |
|----|---------------|--------|
| JP | 2006-339148 A | 12/2006 |

*Primary Examiner* — Phu Vu
(74) *Attorney, Agent, or Firm* — Cowan, Liebowitz & Latman, P.C.

(57) ABSTRACT

A light-emitting device includes: a first planar member having a plurality of light sources; a second planar member being parallel to the first planar member; and a reflecting member reflecting light beams from the respective light sources to the second planar member, the reflecting member being provided on an inner side of a polygon which is defined by the light sources as vertices thereof, wherein the reflecting member having a polygonal pyramidal shape with a bottom surface being parallel to the first planar member satisfies at least one of: a condition that a diffusion distance is from 0.8 to 1.3 when a length of each side of a polygon of the bottom surface is 1; and a condition that an angle between a side surface of the polygonal pyramid and the bottom surface is from 40 degree to 60 degree.

37 Claims, 23 Drawing Sheets

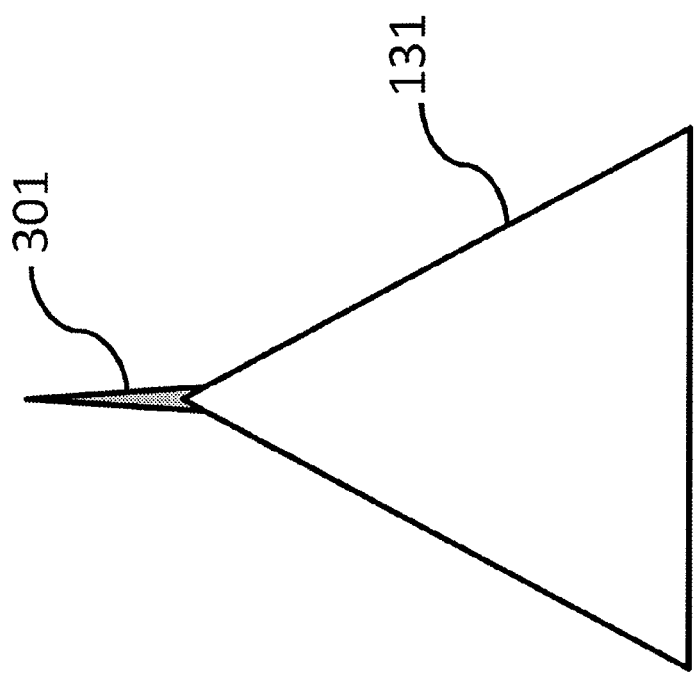
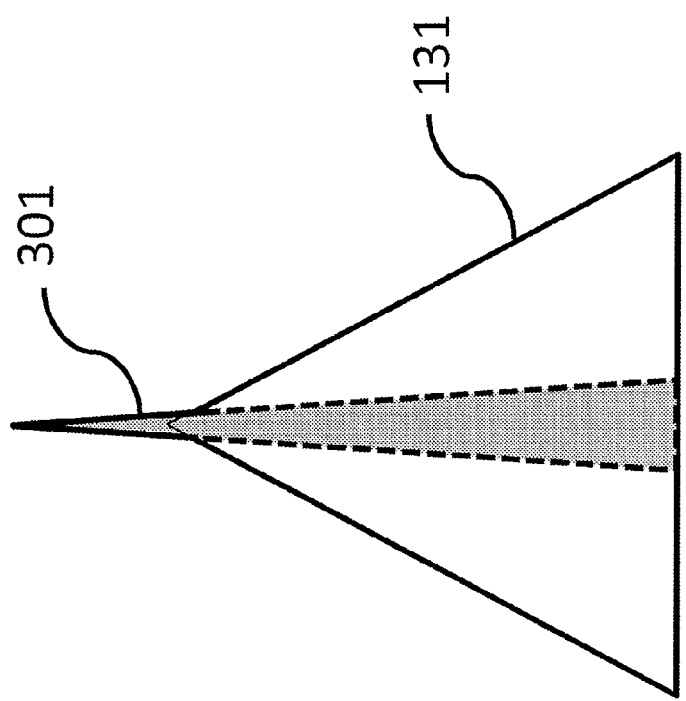

LIGHT-EMITTING DEVICE, BACKLIGHT DEVICE, AND IMAGE DISPLAY APPARATUS

BACKGROUND OF THE INVENTION

1. Field of the Invention

The present invention relates to a light-emitting device, a backlight device, and an image display apparatus.

2. Description of the Related Art

A liquid crystal panel is a non-self-luminous display panel and thus includes a backlight device as a light-emitting device that emits light to the backside of the liquid crystal panel.

The backlight device includes a light source (light-emitting unit), a reflecting plate, a group of optical sheets, and the like. A direct-type backlight device in which LEDs are used as a light source and are arranged in a planar form and at equal intervals so as to be parallel to a group of optical sheets is known.

Light emitted by LEDs has directional characteristics and tends to concentrate on the front surface. Thus, in order to improve the brightness uniformity of a liquid crystal panel, the distance (diffusion distance) between the LEDs and the group of optical sheets needs to be longer than an arrangement interval of the LEDs. As a result, the thickness of the backlight increases.

However, due to market trends in recent years, the backlight needs to be made thinner.

If the diffusion distance is decreased only to make the backlight thinner, brightness unevenness is visible on the display panel due to the directional characteristics of LEDs.

In order to eliminate the brightness unevenness, Japanese Patent Application Publication No. 2006-339148 forms a conical optical member between LEDs. When light emitted from a light source passes through the optical member, the light becomes more uniform. Japanese Patent Application Publication No. 2006-196456 discloses an example of CCFL.

SUMMARY OF THE INVENTION

However, with the arrangement position and the shape of the optical members disclosed in the conventional technique, it was difficult to further decrease the thickness of a backlight device and to improve the brightness uniformity.

Therefore, the present invention provides a backlight device which can shorten the diffusion distance and improve the brightness uniformity.

According to a first aspect of the present invention, there is provided a light-emitting device including: a first planar member in which a plurality of light sources are placed; a second planar member which is provided approximately in parallel to the first planar member and which is irradiated with light from the plurality of light sources; and a first reflecting member which is provided on an inner side of a polygon which is defined by the plurality of light sources of the first planar member as vertices thereof, and which reflects light beams from the respective light sources to the second planar member, wherein a shape of the first reflecting member satisfies at least one of: a first condition under which the shape is a polygonal pyramid, the bottom surface of which is approximately parallel to the first planar member, and a diffusion distance which is a distance between the first planar member and the second planar member is in a range of 0.8 and 1.3 when a length of each side of a polygon of the bottom surface of the polygonal pyramid is 1; and a second condition under which the shape is a polygonal pyramid, the bottom surface of which is approximately parallel to the first planar member, and an angle between a side surface of the polygonal pyramid and the bottom surface is in a range of 40 degree and 60 degree.

According to a second aspect of the present invention, there is provided a light-emitting device including: a first planar member in which a plurality of light sources are placed; a second planar member which is provided approximately in parallel to the first planar member and which is irradiated with light from the plurality of light sources; and a first reflecting member which is provided on an inner side of a polygon which is defined by the light sources of the first planar member as vertices thereof, and which reflects light beams from the respective light sources to the second planar member, wherein the first reflecting member has a polygonal pyramidal shape, the bottom surface of which is approximately parallel to the first planar member, and a plurality of sides that form the bottom surface of the first reflecting member face the plurality of respective light sources in the vicinity of the respecting member.

According to the present invention, it is possible to provide a backlight device which can shorten the diffusion distance and improve the brightness uniformity.

Further features of the present invention will become apparent from the following description of exemplary embodiments (with reference to the attached drawings).

BRIEF DESCRIPTION OF THE DRAWINGS

FIGS. 15A and 15B are diagrams illustrating a method of arranging the spacer 301.

DESCRIPTION OF THE EMBODIMENTS

First Embodiment

Hereinafter, a backlight device according to a first embodiment of the present invention will be described.

Figure 1:
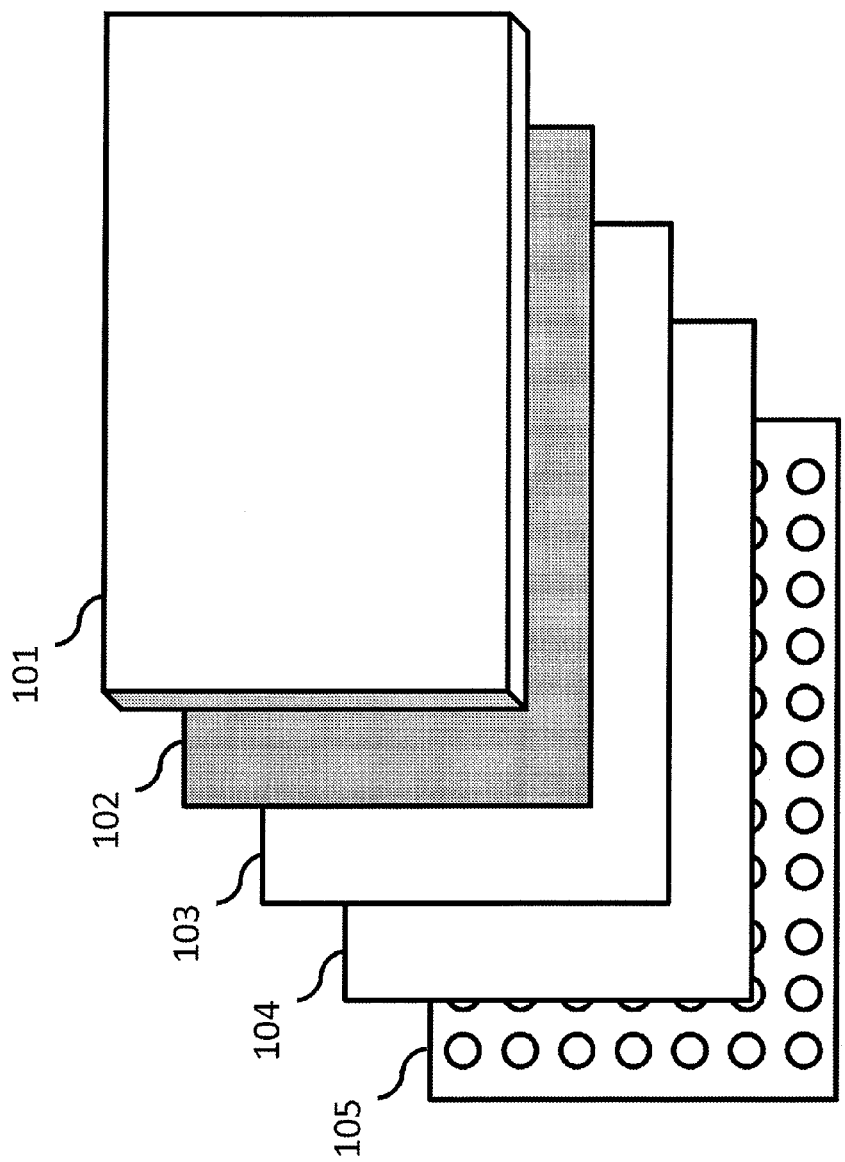
FIG. 1 is a schematic view illustrating an example of a configuration of a liquid crystal display apparatus.

FIG. 1 is a schematic view illustrating an example of a configuration of a liquid crystal display apparatus according to the present embodiment.

The liquid crystal display apparatus includes a backlight device and a liquid crystal panel 101. The backlight device includes a group of optical sheets 102 such as a polarizing film and a light condensing sheet, a diffuser 103, an optical film such as a reflecting sheet 104, a light source substrate 105, and the like.

The group of optical sheets 102 and the diffuser 103 illustrated in FIG. 1 are examples of second planar members which are arranged approximately in parallel to the light source substrate 105 so as to change the optical properties of the light from the light source substrate 105 (a first planar member).

The reflecting sheet 104 illustrated in FIG. 1 is disposed in proximity to the upper surface of the light source substrate 105 so as to reflect the light beam from a light source 111 and the light beam from the diffuser 103.

Figure 2:
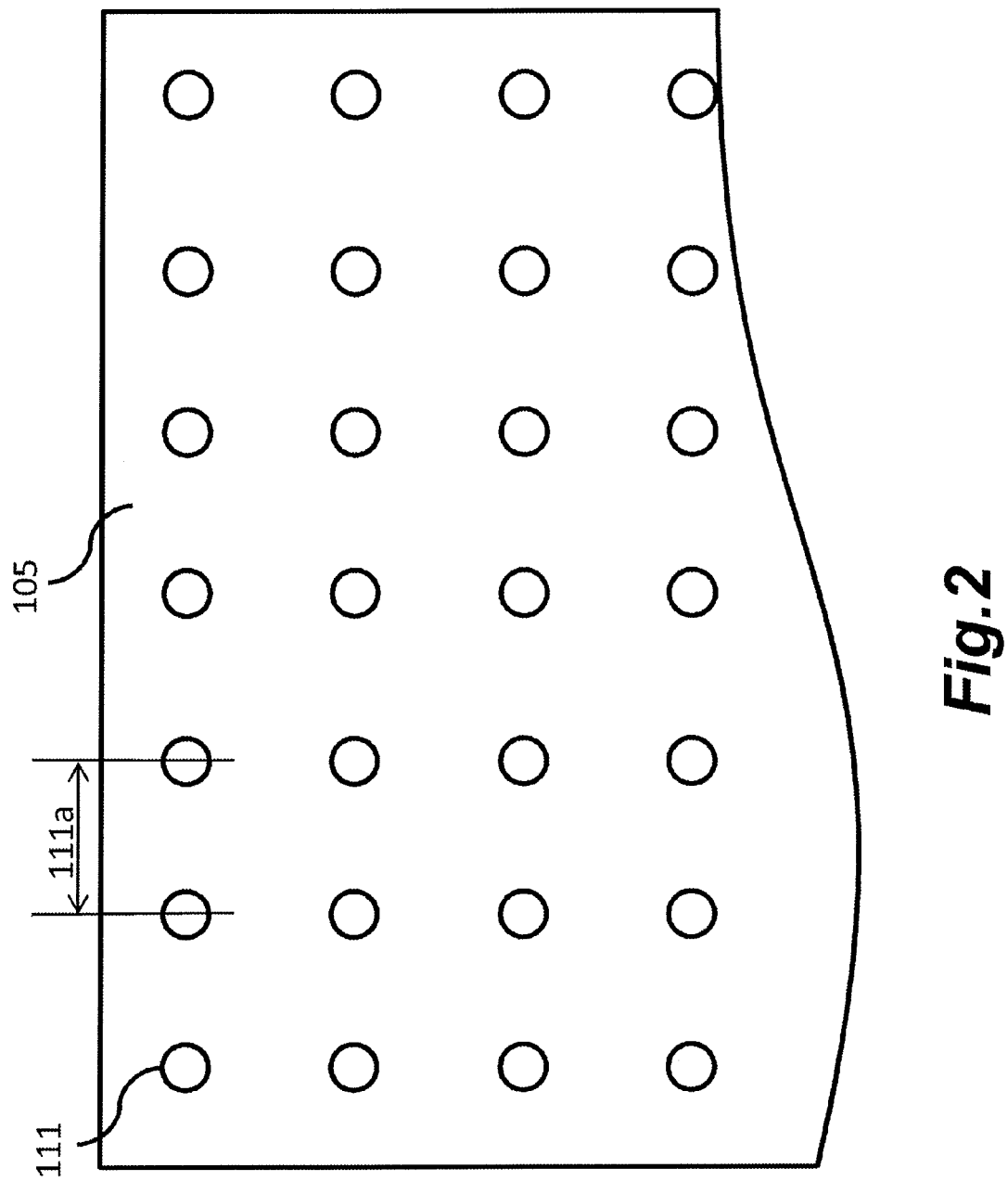
FIG. 2 is a schematic view illustrating an example of a configuration of a light source substrate 105.
Figure 3:
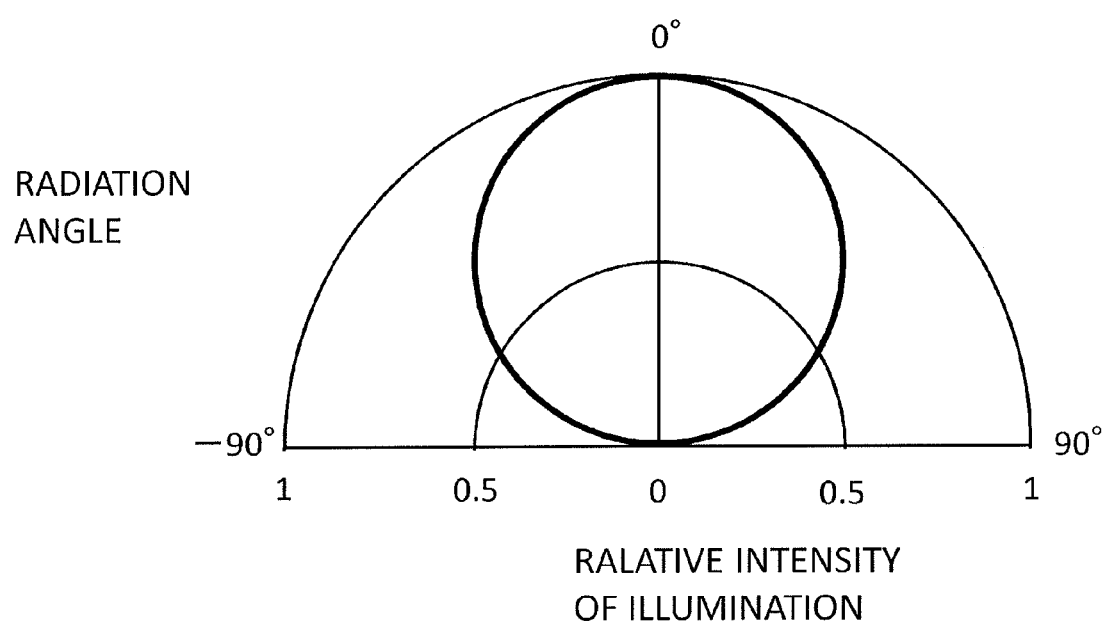
FIG. 3 is a diagram illustrating Lambert light distribution.

FIG. 2 is a schematic view illustrating an example of a configuration of the light source substrate 105. The light source 111 on the light source substrate 105 emits light (white light) that irradiates the backside of the liquid crystal panel 101. A plurality of light sources 111 arranged in a planar form as illustrated in FIG. 2 is provided in the light source substrate 105. The light sources 111 are preferably arranged at equal intervals in vertical and horizontal directions. FIG. 3 is a diagram illustrating Lambert light distribution. As the directional characteristics of light distribution of the light sources 111, LEDs having such Lambert light distribution that light travels in straight lines as illustrated in FIG. 3 are preferable.

Figure 4:
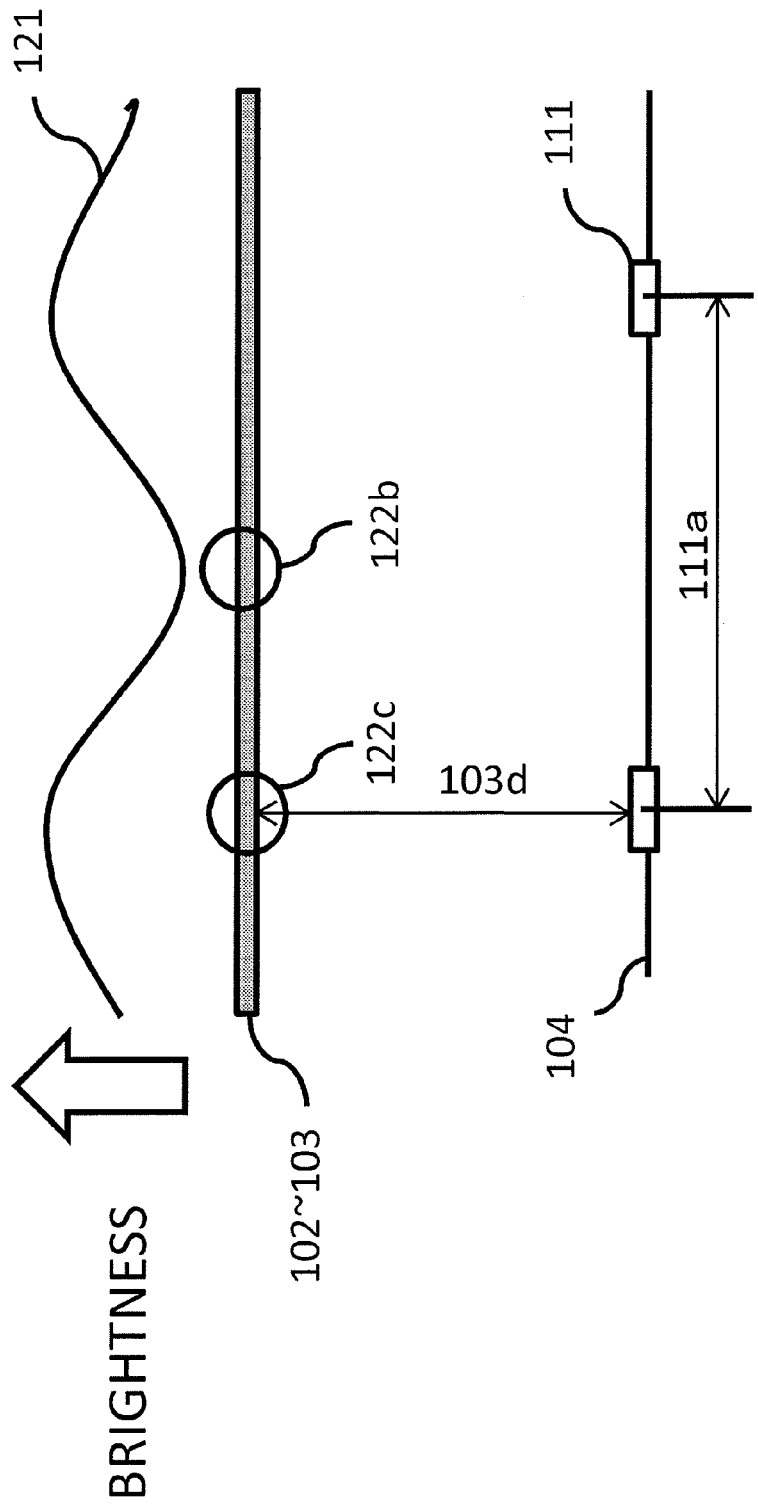
FIG. 4 is a cross-sectional view of a backlight device according to the conventional technique.

FIG. 4 illustrates a cross-sectional view of a backlight device according to the conventional technique and illustrates an example of the corresponding brightness distribution 121. The distance between the light source 111 and the diffuser 103 will be referred to as a diffusion distance 103d. Due to the directional characteristics of the light distribution of the light sources 111, the brightness of the light irradiated to the liquid crystal panel 101 is high approximately at a position (122c) immediately above the light source 111 and is low approximately at a position (122b) between the adjacent light sources 111. Thus, the smaller the diffusion distance 103d as compared to a light source interval 111a which is the distance between light sources, the lower becomes the brightness uniformity. The brightness distribution 121 illustrates an example of the magnitude of brightness when the diffusion distance 103d is small as compared to the light source interval 111a.

Figure 5:
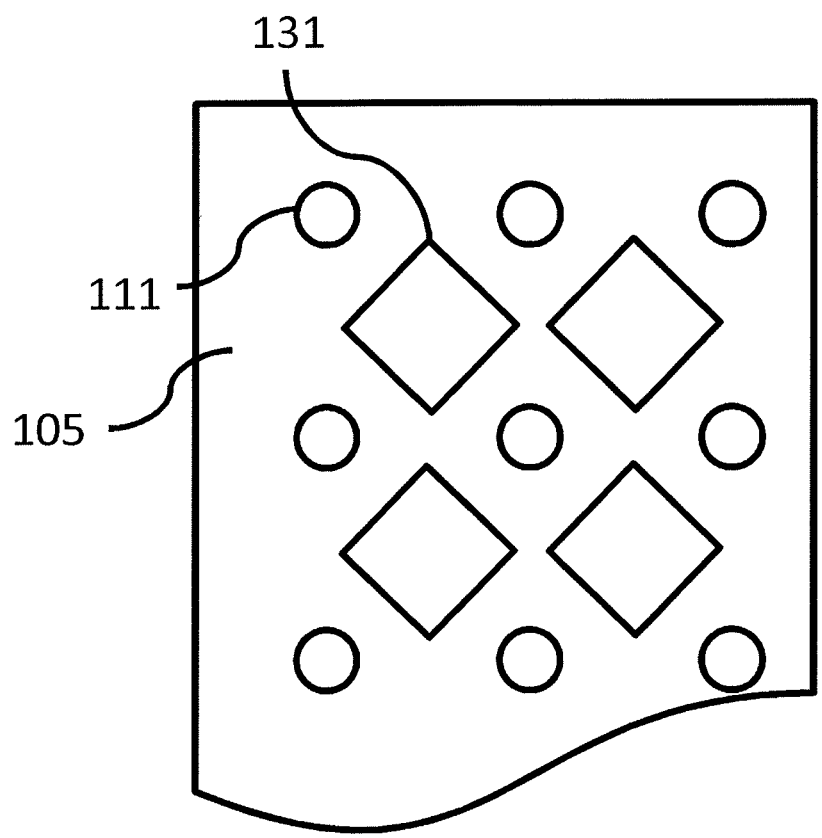
FIG. 5 is a front view of a backlight device in which four-sided pyramids 131 are arranged.

FIG. 5 is a front view of a backlight device in which four-sided pyramids 131 (first reflecting member) formed of reflecting members are arranged on the reflecting sheet 104. In FIG. 5, the four-sided pyramids 131 are arranged so that each four-sided pyramid is disposed at the center of a rectangle surrounded by four light sources 111 of all light sources 111 on the light source substrate 105 and four bases of the four-sided pyramid 131 face the four light sources 111. That is, the diagonals of a square that connects the four light sources 111 and each side of a square of the bottom of the four-sided pyramid 131 are parallel or vertical to each other. The four-sided pyramid 131 is preferably formed of a reflecting member having higher reflectivity than the reflecting sheet 104. Moreover, the four-sided pyramid 131 as a reflecting member may be formed by placing a four-sided pyramidal member on the reflecting sheet 104, and a portion of the reflecting sheet 104 surrounded by four light sources 111 may be deformed in a four-sided pyramidal shape and be integrated with the reflecting sheet 104. Although acute-angled portions 132 (see FIG. 7) of the four-sided pyramid 131 may have a round shape due to manufacturing reasons, the portions preferably have a substantially acute-angled shape. As in the present embodiment, in the case of a backlight device in which the light sources 111 are arranged so that the lines connecting the light sources 111 form a square, it is preferable to use the four-sided pyramid 131 as the reflecting member. On the other hand, in the case of a backlight device in which the light sources 111 are arranged so that the lines connecting the light sources 111 form an equilateral polygon such as an equilateral triangle or an equilateral pentagon, it is preferable to arrange equilateral polygonal pyramids such as trigonal pyramids or pentagonal pyramids according to an arrangement of the light sources. For example, when light sources are arranged so that five light sources form an equilateral pentagon, pentagonal pyramidal reflecting members may be arranged so that each reflecting member is disposed at the center of the equilateral pentagon surrounded by the five light sources and bases thereof face the respective light sources.

Figure 6:
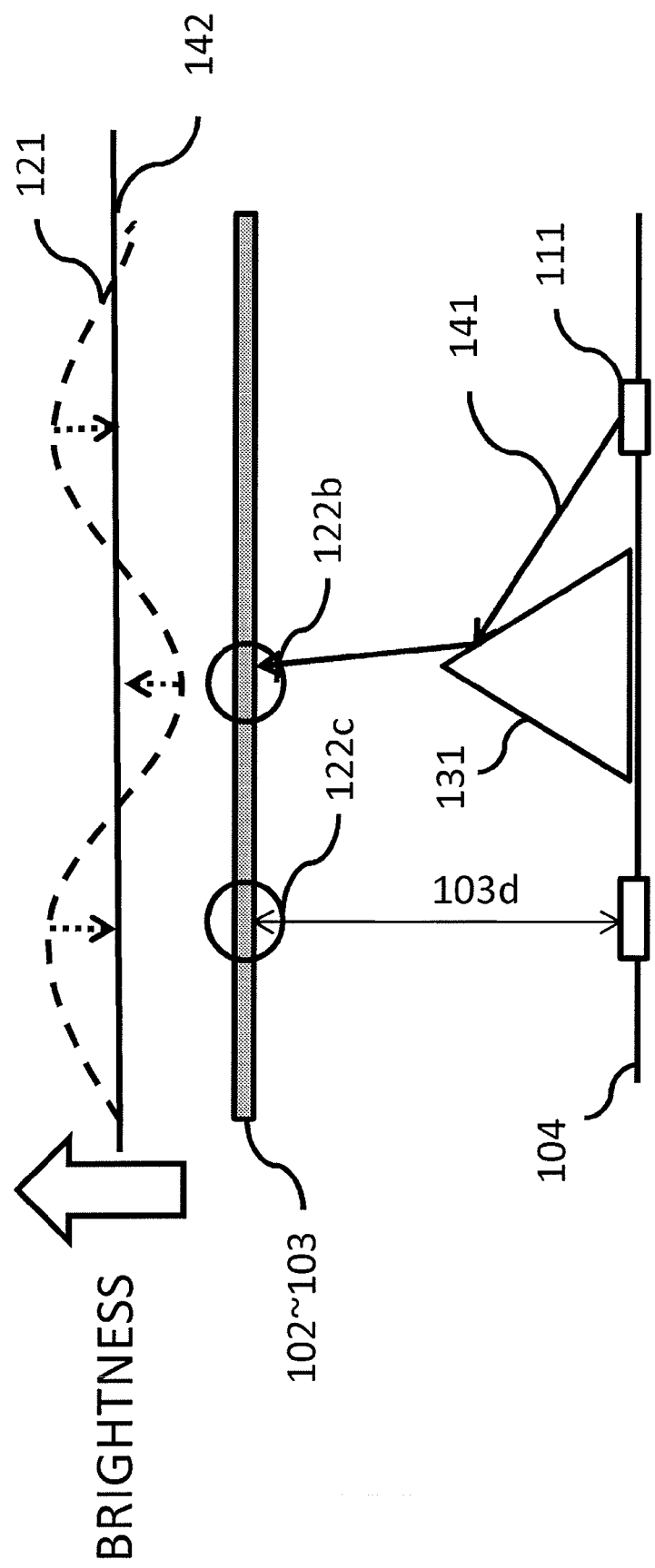
FIG. 6 is a cross-sectional view of a backlight device in which four-sided pyramids 131 are arranged.

FIG. 6 illustrates a cross-sectional view of a backlight device in which the state of a light beam when the four-sided pyramids 131 are arranged is depicted and illustrates an example of the corresponding brightness distribution 142. In FIG. 6, among the light beams emitted from the light source 111, a light beam 141 which would have been directed immediately above a neighboring light source 111 if the four-sided pyramid 131 were not present is reflected from the side surface of the four-sided pyramid 131 and is directed to approximately a position (122b) immediately above the four-sided pyramid 131 when the four-sided pyramid 131 is arranged. Due to this principle, since the brightness is low approximately at a position (122c) immediately above the light source 111 and is high approximately at a position (122b) between the adjacent two light sources 111, a brightness difference appearing when the diffusion distance 103d is shortened is reduced, and the brightness uniformity increases.

Figure 7:
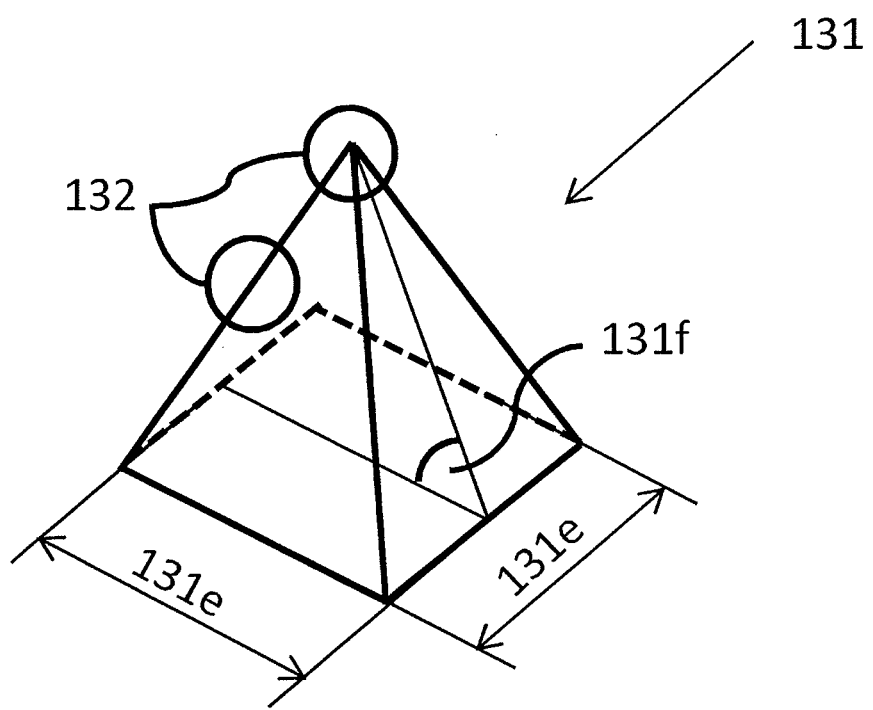
FIG. 7 is a schematic view of one four-sided pyramid 131.

FIG. 7 is a schematic view of one four-sided pyramid 131. The four-sided pyramid 131 preferably has such a shape that a bottom surface is square, the four side surfaces are formed of isosceles or equilateral triangles of the same shape, and the apex is on the center of the bottom surface.

Figure 8:
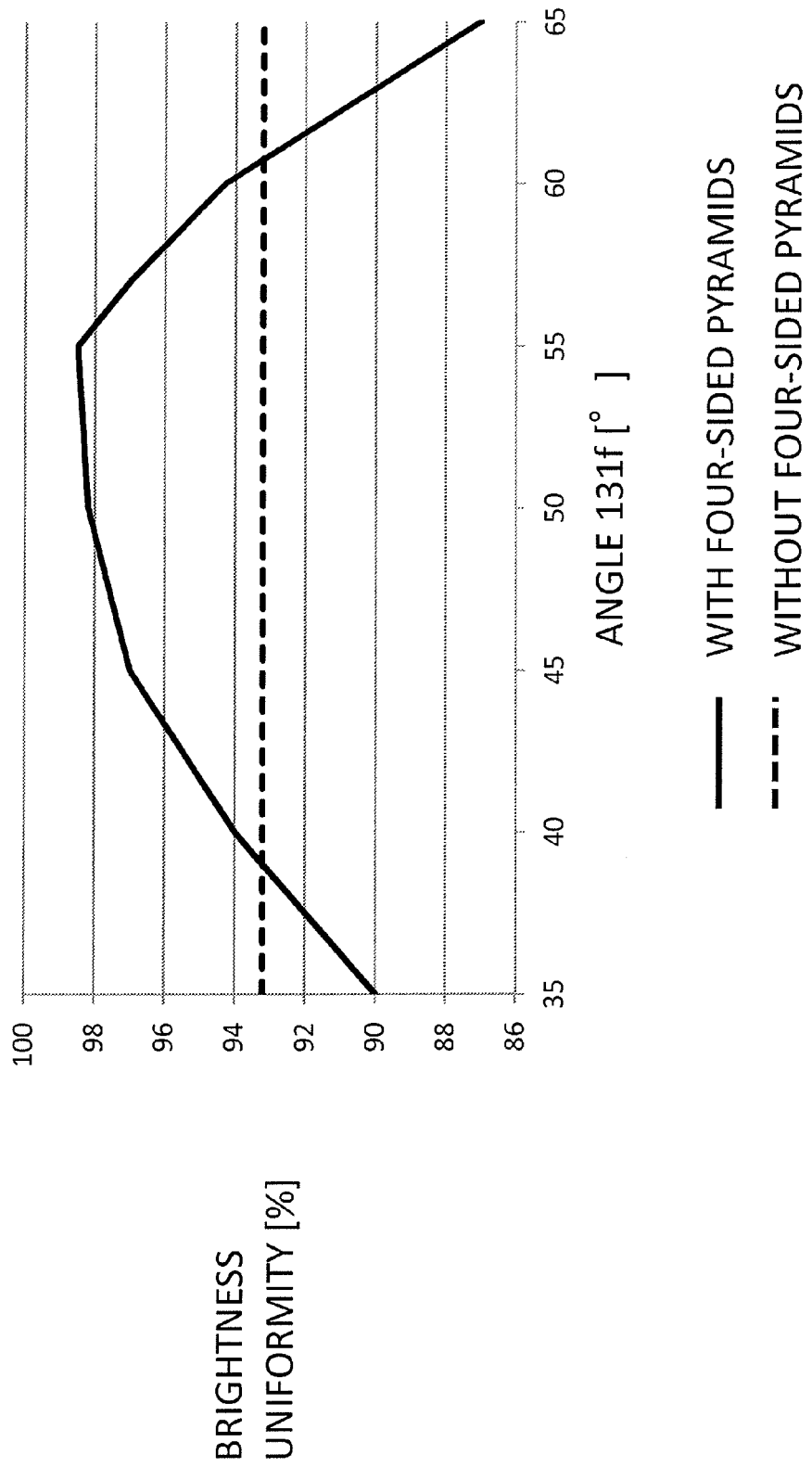
FIG. 8 is a graph illustrating the relation between a brightness uniformity and an angle between a bottom surface and a side surface of a four-sided pyramid 131.
Figure 9:
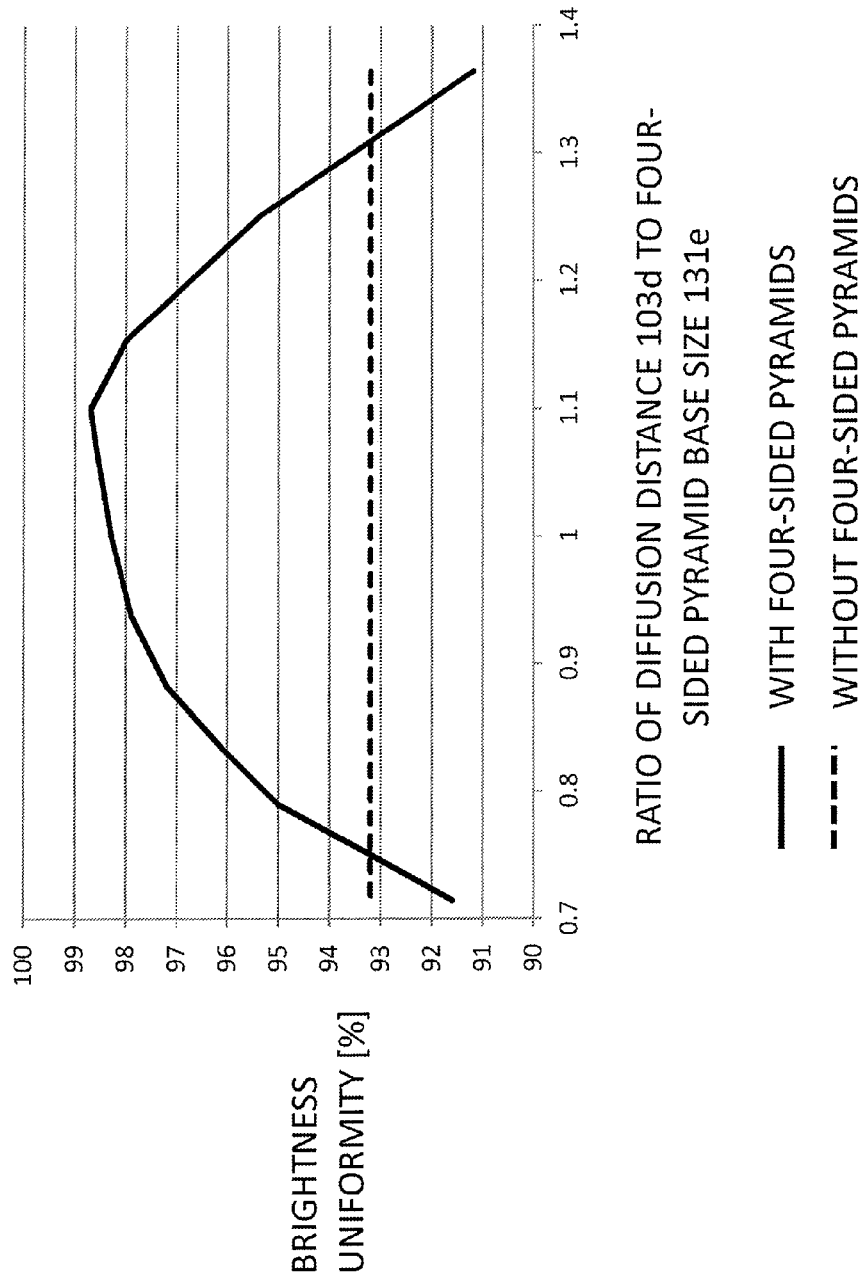
FIG. 9 is a graph illustrating the relation between a brightness uniformity and the size 131e of a four-sided pyramid base.

The size of the four-sided pyramid 131 is determined by the relation between a size 131e of the four-sided pyramid base and the diffusion distance 103d and an angle 131f between the bottom surface and the side surface of the four-sided pyramid 131. FIG. 8 is a graph illustrating the relation between a brightness uniformity and the angle 131f when the light source interval 111a and the diffusion distance 103d have optional constant values. FIG. 9 is a graph illustrating the relation between a brightness uniformity and the size 131e of the four-sided pyramid base under the same condition. In FIG. 9, the horizontal axis represents the diffusion distance 103d when the size 131e of the four-sided pyramid base is 1

(that is, the ratio 103d/131e of the diffusion distance 103d to the size 131e of the four-sided pyramid base).

From FIGS. 8 and 9, the four-sided pyramid 131 with which the brightness uniformity becomes higher than that of the conventional structure without the four-sided pyramid 131 has such a shape that, when the size 131e of the four-sided pyramid base is 1, the diffusion distance 103d is approximately between 0.8 and 1.3 (first condition). Moreover, the angle 131f between the bottom surface and the side surface of the four-sided pyramid 131 is approximately between 40 degree and 60 degree (second condition). A particularly optional shape of the four-sided pyramid 131 is such that the ratio 103d/131e of the diffusion distance 103d to the size 131e of the four-sided pyramid base is 1.1 and that the angle 131f between the bottom surface and the side surface of the four-sided pyramid 131 is 55 degree. With this shape, the brightness uniformity is the highest.

Figure 10:
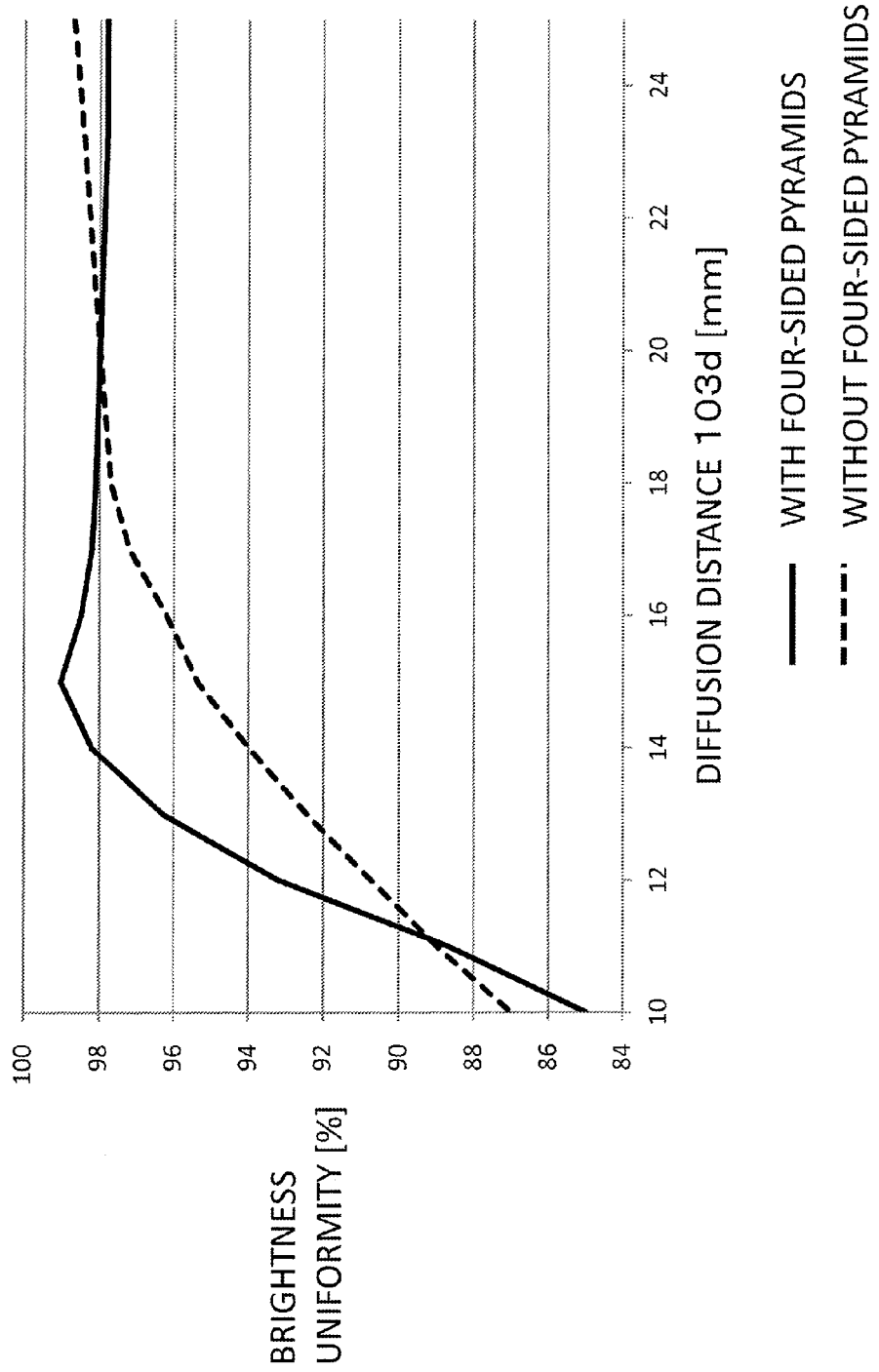
FIG. 10 is a graph illustrating the relation between a brightness uniformity and a diffusion distance 103d.

For example, when the light source interval 111a is 20 mm and the diffusion distance 103d is 15 mm, the optimal shape of the four-sided pyramid 131 with which the brightness uniformity becomes highest is such that the size 131e of the four-sided pyramid base is 13.5 mm and the height of the four-sided pyramid is 11 mm. In this case, the brightness uniformity is approximately 99%, and approximately 4% of improvement is obtained as compared to the brightness uniformity of a backlight device in which the four-sided pyramids 131 are not arranged under the same conditions of the light source interval 111a and the diffusion distance 103d. FIG. 10 is a graph illustrating the relation between a brightness uniformity and the diffusion distance 103d when the light source interval 111a is constant (20 mm), and the four-sided pyramids 131 having the optimal shape determined in the above-described manner are arranged. When the diffusion distance 103d is in the range of 12 mm and 20 mm (which is 0.6 times to 1 times the light source interval 111a), an improvement in the brightness uniformity is obtained as compared to the conventional structure without the four-sided pyramids 131 by arranging the four-sided pyramids 131 having the optimal shape.

As described above, according to the present embodiment, it is possible to provide a backlight device which provides high brightness uniformity even when the diffusion distance 103d is smaller than the light source interval 111a of the backlight device. The advantage of the present embodiment is not limited to when the light source interval 111a is the light source interval 111a illustrated in the present embodiment.

Figure 11:
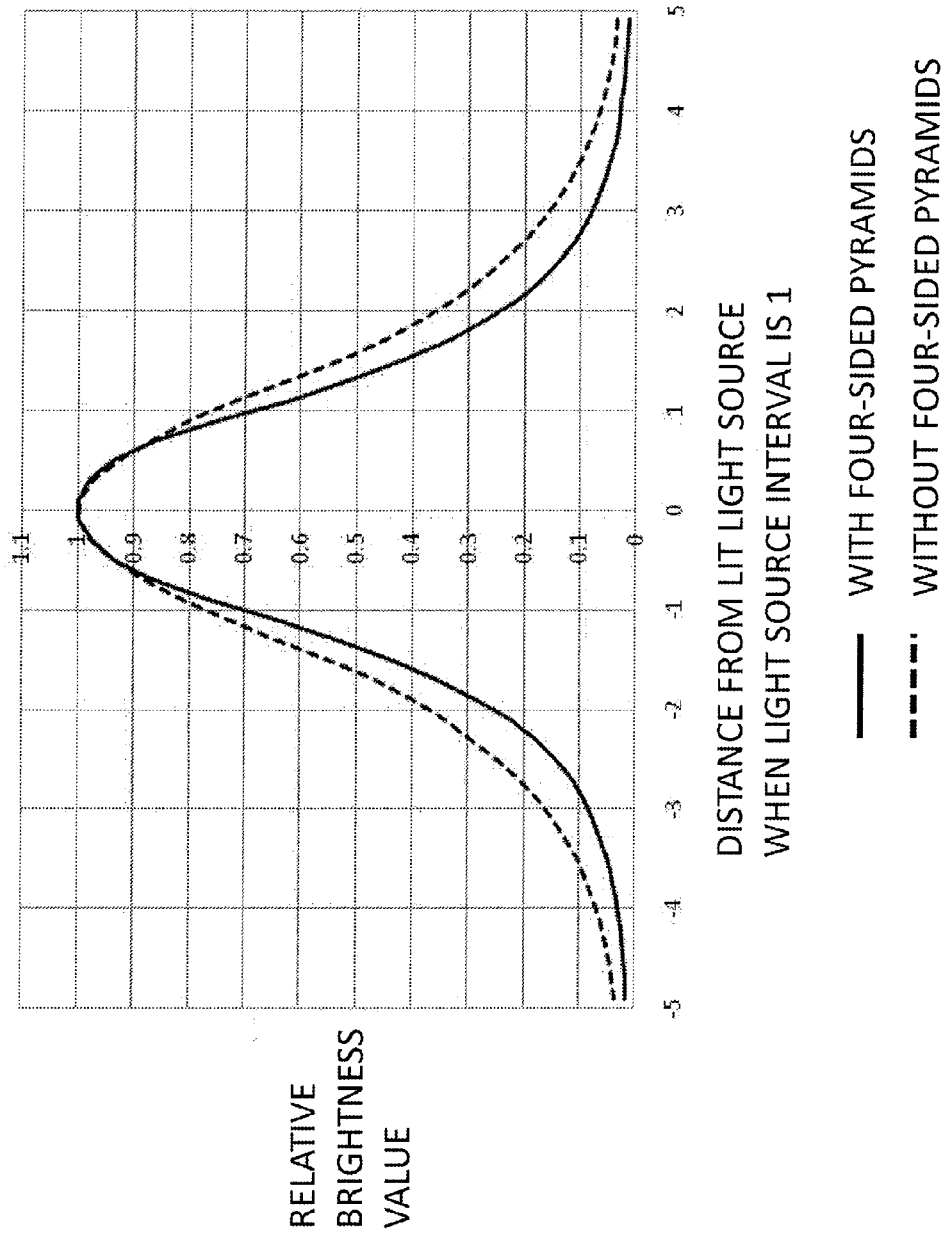
FIG. 11 is a graph illustrating the relation between brightness and a distance from a light source.

In the structure of the backlight device of the present embodiment, the light beam emitted from the light source 111 is reflected from the four-sided pyramid and irradiates and concentrates on a region extending from a position immediately above the light source 111 to a position between the adjacent light source 111 and a neighboring region thereof. Due to this, it is possible to suppress light from spreading to a region in which the other light source 111 such as an adjacent light source 111 is disposed. FIG. 11 illustrates a brightness distribution when only one light source 111 emits light. For example, the distance at which brightness becomes half the brightness at a position immediately above the light source 111 is approximately 0.8 times that of the conventional backlight device in which the four-sided pyramids 131 are not arranged. Due to this effect, since the influence of light leaking from an adjacent light source or a neighboring light source thereof is suppressed, it is possible to improve the contrast ratio when local dimming control is performed.

Second Embodiment

Hereinafter, a backlight device according to a second embodiment of the present invention will be described. In the present embodiment, a configuration in which the diffusion distance 103d is further shortened than the first embodiment so that the brightness uniformity can be increased more than the conventional structure without the four-sided pyramid 131 will be described. The same members as those of the first embodiment will be denoted by the same reference numerals, and the description thereof will not be provided.

In the second embodiment, it is preferable that the four-sided pyramid 131 is formed by deforming the reflecting sheet 104 and is integrated with the reflecting sheet 104.

Figure 12:
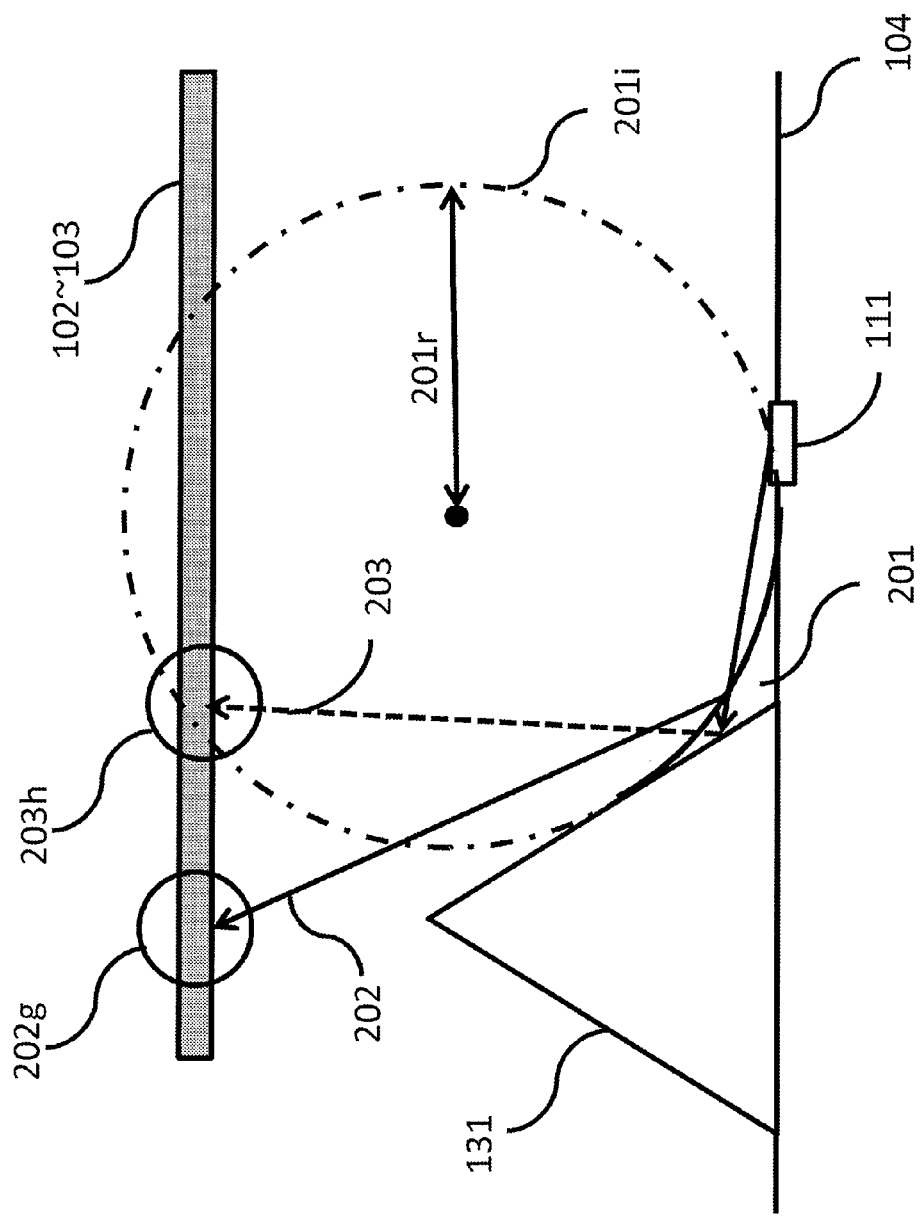
FIG. 12 is a cross-sectional view of a backlight device in which four-sided pyramids 131 of which a lower side surface has a curved surface are arranged.

FIG. 12 is a cross-sectional view of a backlight device in which the state of a light beam when the four-sided pyramids 131 of which the lower side surface (a side portion close to the bottom surface) of the four-sided pyramid has a curved surface 201 is depicted. In the first embodiment, a light beam 203 reflected from the lower side surface of the four-sided pyramid 131 irradiates approximately a position 203h of the group of optical sheets 102 and the diffuser 103. In the present embodiment, since the lower side surface of the four-sided pyramid 131 has the curved surface 201, a light beam 202 is reflected from the curved surface 201 and irradiates approximately a position 202g of the group of optical sheets 102 and the diffuser 103.

Due to this principle, the brightness near the position 202g where the brightness was low becomes higher than that of the first embodiment, and the brightness uniformity can be increased.

Figure 13:
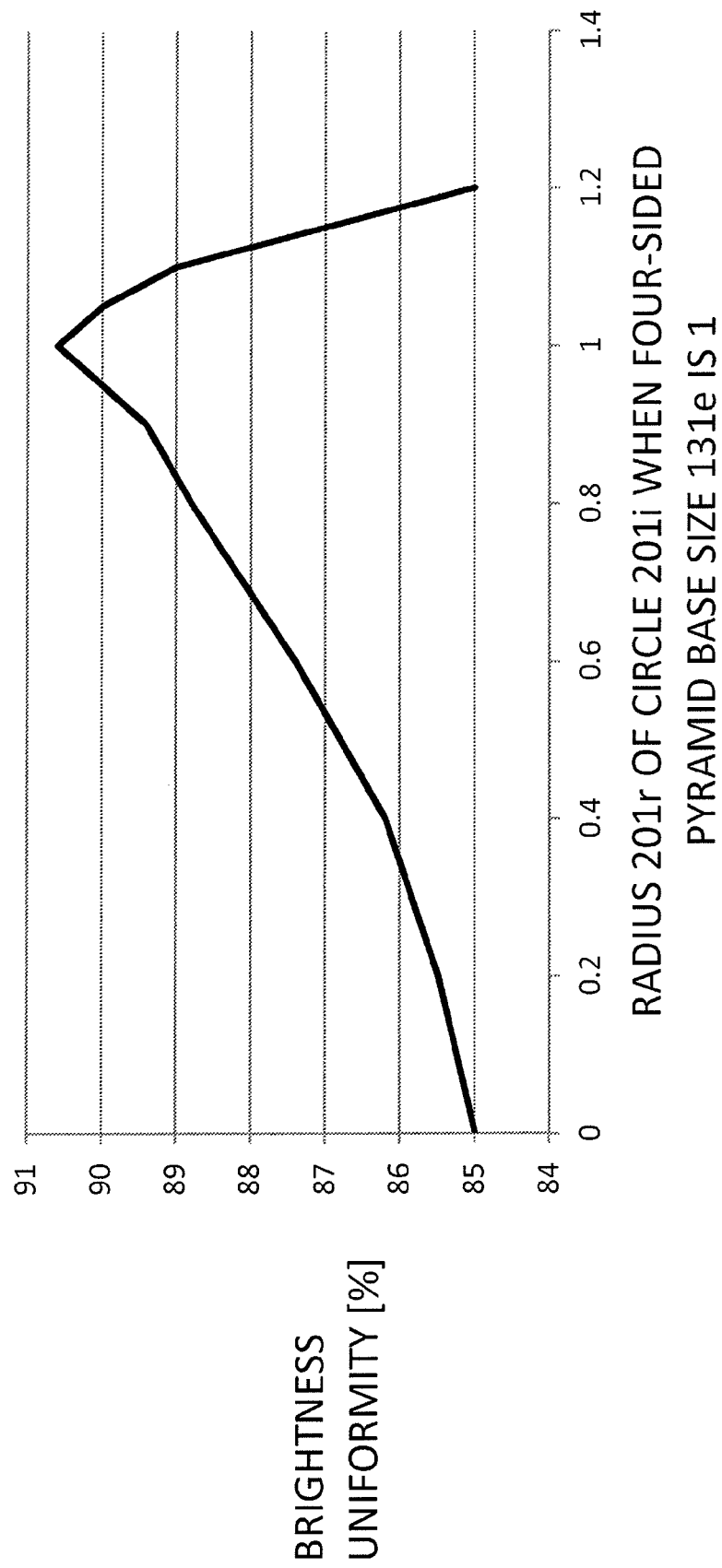
FIG. 13 is a graph illustrating the relation between a brightness uniformity and the size of a curved surface of the lower side surface of the four-sided pyramid 131.

An optimal size of the curved surface 201 is determined by a radius 201r of a circle 201i that touches the side surface of the four-sided pyramid 131 and the reflecting sheet 104 as illustrated in FIG. 12. The curved surface 201 is a portion of the surface of a cylinder which touches the side surface of the four-sided pyramid 131 and the reflecting sheet 104 and of which the central axis is parallel to the light source substrate 105. FIG. 13 is a graph illustrating the relation between a brightness uniformity and the radius 201r of the circle 201i when the four-sided pyramids 131 having the optimal shape described in the first embodiment are arranged under a condition that the diffusion distance 103d is half the light source interval 111a. In FIG. 13, the horizontal axis represents the radius 201r of the circle 201i when the size 131e of the four-sided pyramid base is 1. When the diffusion distance 103d is half the light source interval 111a (in FIG. 10, the diffusion distance 103d is 10 mm), as illustrated in FIG. 10, even when the four-sided pyramid has the optimal shape described in the first embodiment, the brightness uniformity is approximately 85%, which is not higher than the conventional structure. However, in the present embodiment, as illustrated in FIG. 13, the ratio 201r/131e of the radius 201r of the circle 201i of the shape of the curved surface of the lower side surface to the size 131e of the four-sided pyramid base is approximately between 0.6 and 1.1. In this way, it is possible to improve the brightness uniformity as compared to the conventional structure. Moreover, an optimal case is that the radius 201r of the circle 201i is the same as the size 131e of the four-sided pyramid base (that is, the ratio 201r/131e of the radius 201r of the circle 201i to the size 131e of the four-sided pyramid base is 1).

When the four-sided pyramid 131 in which the curved surface 201 is formed on the lower side surface as in the present embodiment is used, it is possible to increase the brightness uniformity as compared to the conventional structure without the four-sided pyramid 131 under a condition that the ratio of the light source interval 111a to the diffusion distance 103d is 1:0.5.

As described above, according to the present embodiment, it is possible to provide a backlight device which provides high brightness uniformity even when the diffusion distance 103d is further decreased than the first embodiment.

Third Embodiment

Hereinafter, a backlight device according to a third embodiment of the present invention will be described. In the present embodiment, an arrangement position of a spacer when the four-sided pyramids 131 as described in the first embodiment are arranged in the backlight device will be described. The same members as those of the first embodiment will be denoted by the same reference numerals and the description thereof will not be provided.

In the conventional backlight device, a spacer is formed at an optional position on the light source substrate 105 as a support member in order to support the group of optical sheets 102 and the diffuser 103. However, in the backlight device to which the first embodiment is applied, when a spacer is disposed between the light source 111 and the four-sided pyramid 131, for example, a light beam which has to reach the four-sided pyramid 131 reaches the spacer and the optical properties changes. Due to this, the improvement in the brightness uniformity as described in the first embodiment may decrease.

Figure 14:
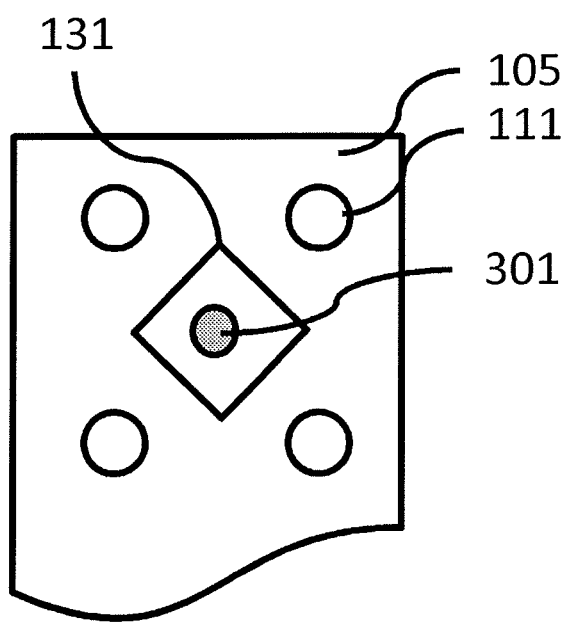
FIG. 14 is a diagram illustrating an arrangement position of a spacer 301.

FIG. 14 is a diagram illustrating an arrangement position of the spacer 301 when the four-sided pyramids 131 are arranged in the present embodiment. The spacer 301 is disposed at the center (the center of the four light sources 111) of the bottom surface of the four-sided pyramid 131 as illustrated in FIG. 14 so as to be vertical to the light source substrate 105. The spacer 301 is disposed so as to pass the apex of the four-sided pyramid 131 as illustrated in FIG. 15A. At this position, when the spacer 301 is disposed so as to be concealed by the four-sided pyramid 131, the amount of light beam reaching the spacer 301 decreases, and the influence on the optical properties can be minimized. In FIG. 15A, a portion depicted by broken lines indicates that the portion is concealed inside the four-sided pyramid 131. Moreover, as illustrated in FIG. 15B, the spacer 301 may be disposed so as to be attached to the apex of the four-sided pyramid 131.

For example, the spacer 301 having a conical shape of which the radius of the bottom surface is 2 mm and the height is 14 mm is disposed in the four-sided pyramid 131 having a shape with which the brightness uniformity becomes the highest when the light source interval 111a is 20 mm as illustrated in the first embodiment so as to pass the four-sided pyramid 131. In this case, since the distance between the apex of the spacer 301 and the diffuser 103 is 1 mm and the spacer 301 is substantially concealed by the four-sided pyramid 131, the influence of the spacer 301 on the optical properties is small, and a decrease in the improvement of the brightness uniformity described in the first embodiment can be suppressed.

The arrangement position of the spacer 301 of the third embodiment is not limited to the embodiment in which the reflecting member is formed as the four-sided pyramid 131 but can be similarly applied to various embodiments in which the reflecting member is formed in a pyramidal shape or a columnar shape, and the same advantage as that described in the first embodiment can be obtained. Moreover, the spacer 301 is not limited to the conical shape described in the present embodiment but can be formed in a pyramidal shape, a columnar shape, or a combination of the pyramidal shape and the columnar shape, and the same advantage as that described in the first embodiment can be obtained.

Moreover, in the present embodiment, the reflecting member (the four-sided pyramid 131) itself may be configured to perform the role of the spacer 301. When the reflecting member has sufficient strength and is configured to perform the function of the spacer 301, it is possible to decrease the number of spacers 301 or eliminate the spacer 301. Since the smaller the number of spacers 301, the better the influence on the improvement in the brightness uniformity can be reduced, it is possible to further increase the brightness uniformity of the backlight device by decreasing the number of spacers 301 or eliminating the spacer 301.

As described above, according to the present embodiment, it is possible to provide a thin backlight device which provides high brightness uniformity even when the spacer 301 is disposed.

In the present embodiment, the arrangement of the spacer 301 has been described. However, the present embodiment can be applied to a member which has a 3-dimensional structure other than the spacer 301, and of which a portion or an entire portion can be concealed in the reflecting member. That is, by arranging a member that has influence on the brightness uniformity inside the reflecting member, it is possible to further improve the brightness uniformity. Examples of such a member include a sensor component, a screw member, and the like on the light source substrate 105.

While preferred embodiments of the present invention have been described, the present invention is not limited to these embodiments and various modifications and changes can be made within the scope of the spirit thereof. For example, the present invention is not limited to a backlight device of an image display apparatus but can be applied to a variety of light-emitting devices which include a plurality of light sources and in which it is preferable to have uniform brightness on a light-emitting surface. By doing so, the above-described unique advantages can be provided. The display panel of the present invention is not limited to the liquid crystal panel of the embodiments but a display panel to which the backlight device of the present embodiment can be applied may be used.

Fourth Embodiment

Hereinafter, a backlight device according to a fourth embodiment of the present invention will be described.

Figure 16:
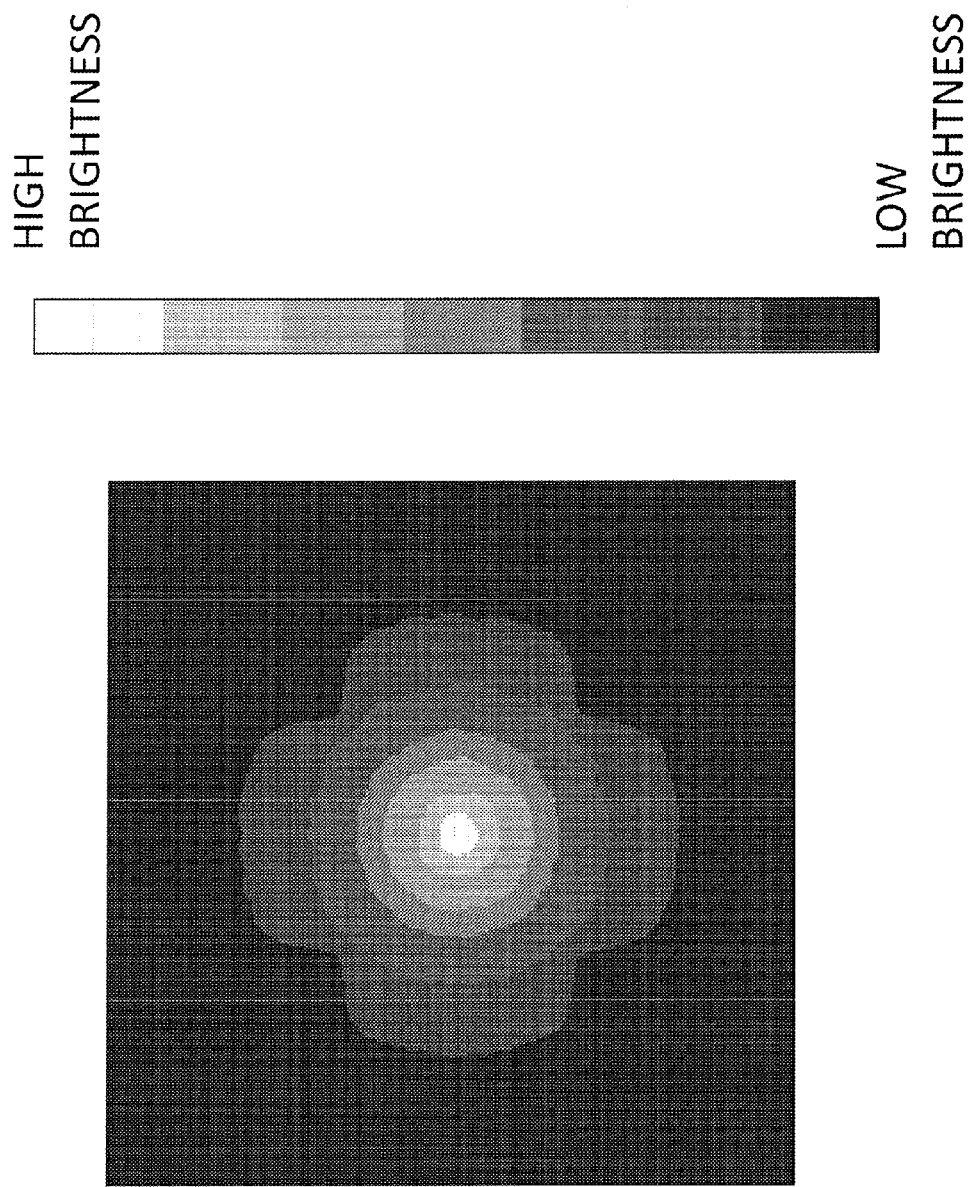
FIG. 16 illustrates a brightness distribution when only one light source 111 is lit in the structure of the first embodiment.

In the first and second embodiments, although it is possible to improve the contrast ratio when local dimming control is performed as shown in the first embodiment, light emitted from the light source leaks through a position which is disposed between the adjacent two four-sided pyramids 131 (the first reflecting members) and in which no reflecting structure is present. That is, since there is a direction in which light it reflected by the four-sided pyramid 131 and a direction in which light leaks because of absence of reflecting structure, the way the light spreads differs depending on directions. Thus, a distortion may occur in the brightness distribution when only one light source is lit. FIG. 16 illustrates an example of a brightness distribution in which such a distortion has occurred. FIG. 16 schematically illustrates a light spreading pattern and a brightness distribution when a backlight is seen from the front side and illustrates a case where the brightness distribution is approximately cross-shaped. If the way the light spreads, when only one light source is lit, differs depending on directions, a user may feel a sense of interferences when local dimming control is performed.

Thus, in the fourth embodiment, a configuration which can shorten the diffusion distance and improve the brightness uniformity when all the lights are lit, and moreover which implements a uniform light brightness spreading when only one light source is lit. The same members as those of the first embodiment will be denoted by the same reference numerals, and the description thereof will not be provided.

Figure 17:
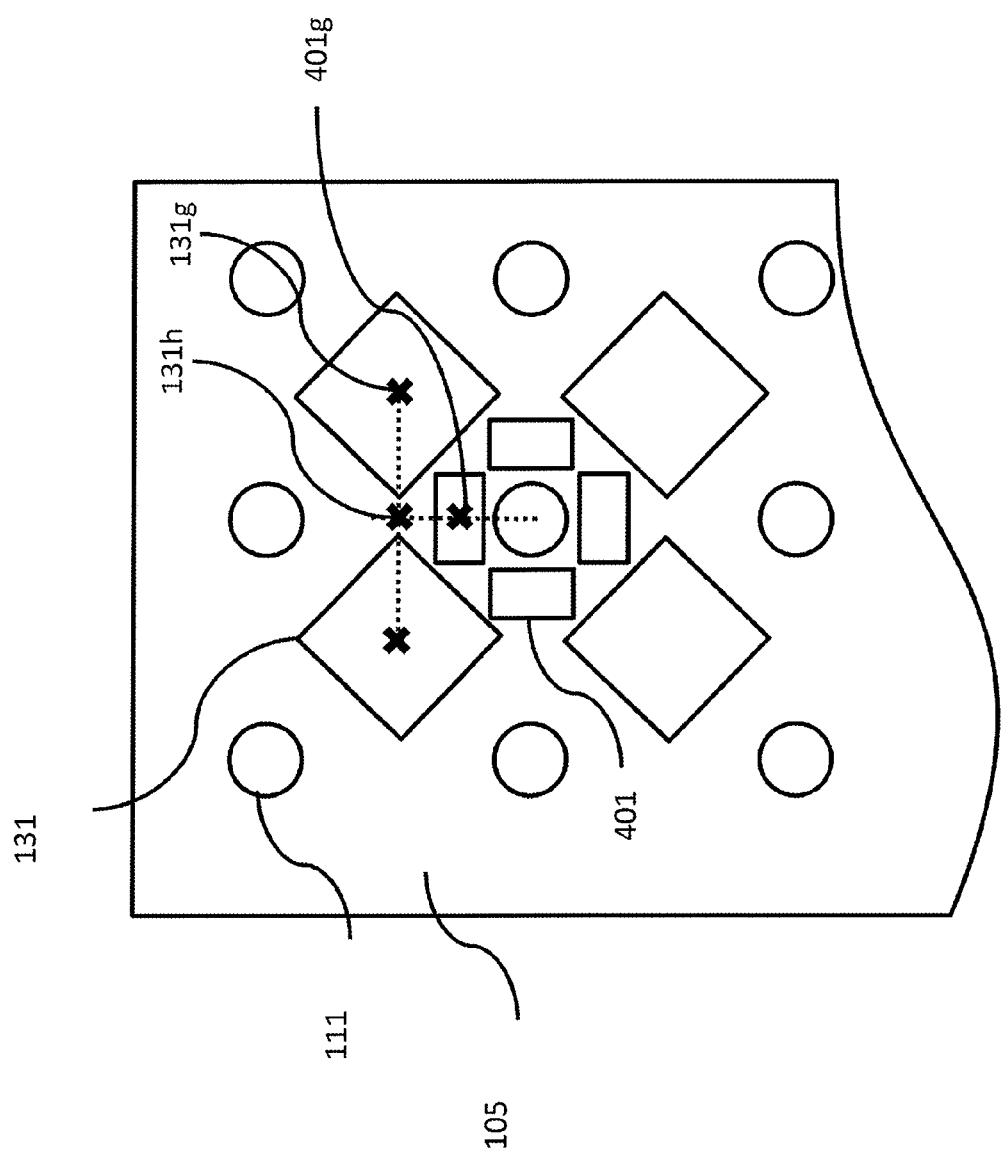
FIG. 17 is a front view of a backlight device, illustrating an arrangement position of reflectors 401.

FIG. 17 is a front view of a backlight device in which reflectors 401 are added to the structure (FIG. 5) of the first embodiment. A plurality of four-sided pyramids 131 (first reflecting members) are provided on the light source substrate 105 (first planar member). The plurality of four-sided pyramids 131 are arranged so that the light source 111 is positioned on an inner side of a polygon (a tetragon in this example) which is defined by the plurality (four in this example) of four-sided pyramids 131 as vertices thereof. On the inner side of the square defined by the four four-sided pyramids 131 surrounding the light source 111 as vertices thereof, the reflector 401 (second reflecting member) is provided at a position 401g that is located between the light source 111 and a position 131h between the adjacent two four-sided pyramids 131. The reflector 401 is a reflecting member that reflects light from the light source 111 toward the group of optical sheets 102 and the diffuser 103 (second planar member). In the fourth embodiment, as illustrated in FIG. 17, the reflectors 401 are disposed between the light source 111 and the midpoints 131h of the adjacent four-sided pyramids 131. The plurality of reflectors 401 are not integrated with each other but are independent members and are arranged so that light from the light source 111 passes through the gap between the adjacent reflectors 401 to reach the four-sided pyramids 131. At least one surface of the reflector 401 faces the light source 111.

Moreover, the reflector 401 as the reflecting member may be formed by being placed on the reflecting sheet 104, or a portion of the reflecting sheet 104 surrounded by four light sources 111 may be deformed so that the reflector 401 is integrated with the reflecting sheet 104. As in the fourth embodiment, in the case of a backlight device in which the light sources 111 are arranged so that the lines connecting the light sources 111 form a square, and the four-sided pyramids 131 are arranged as the reflecting members, it is preferable to arrange four reflectors 401 around one light source so as to block the gaps between the four-sided pyramids 131.

On the other hand, in the case of a backlight device in which the light sources 111 are arranged so that the lines connecting the light sources 111 form an regular polygon such as an equilateral triangle or an equilateral pentagon, and regular polygonal pyramids such as trigonal pyramids or pentagonal pyramids are arranged as the reflecting members according to the arrangement of the light sources, it is preferable to arrange a number of reflectors 401 corresponding to the number of vertices of the pyramids so as to block the gaps between the polygonal pyramids similarly. For example, in the case of a backlight device in which light sources are arranged so that five light sources form an equilateral pentagon, and pentagonal pyramidal reflecting members are arranged so that each reflecting member is disposed at the center of the equilateral pentagon surrounded by the five light sources and bases thereof face the respective light sources, five reflectors 401 may be arranged around one light source so as to block the gaps between the pentagonal pyramidal reflecting members.

Figure 18:
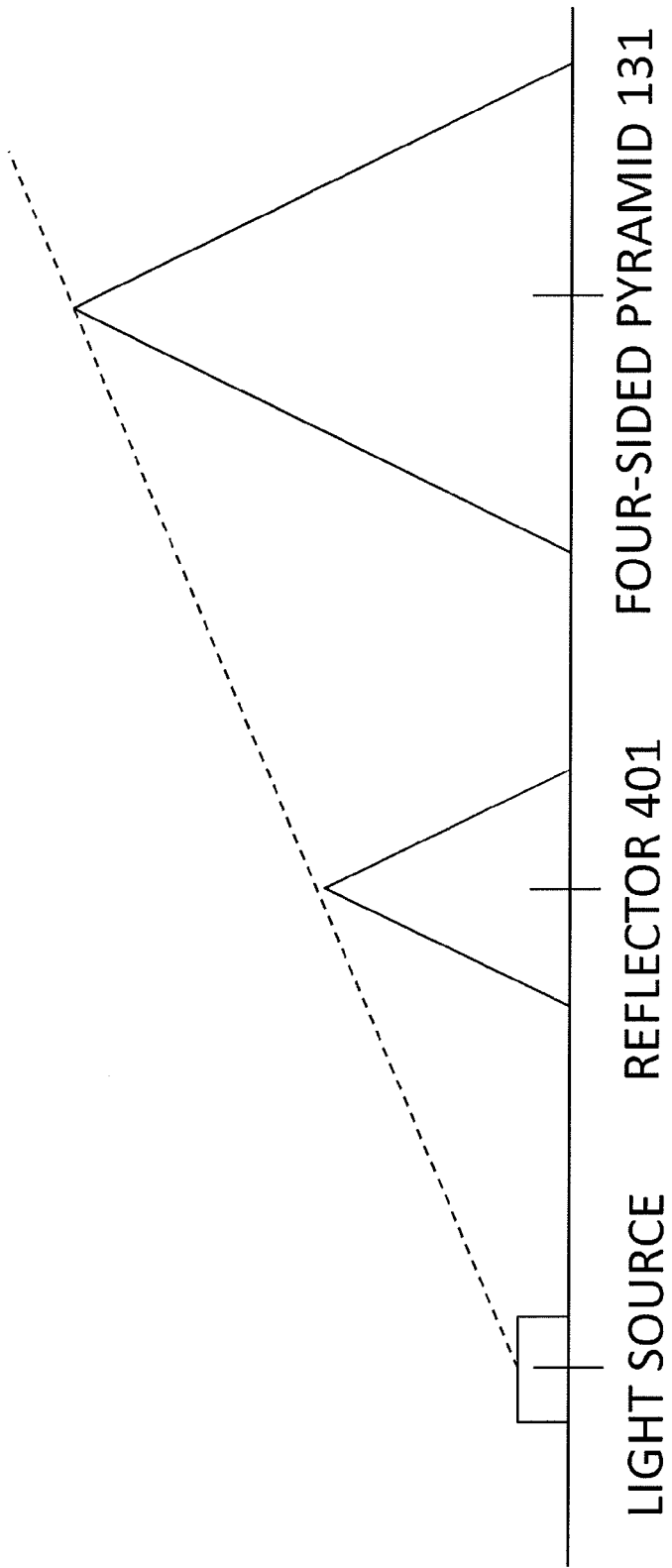
FIG. 18 is a cross-sectional view of a backlight device, illustrating an arrangement position of the reflector 401.

FIG. 18 is a schematic side view of a backlight device with the reflectors 401 being arranged. The shape and the position of the reflector 401 are determined according to the shape of the four-sided pyramid 131 and the positional relation between the light source 111 and the four-sided pyramid 131. In the fourth embodiment, the height of the reflector 401 is half the height of the four-sided pyramid 131. The height of the reflector 401 is determined such that the apex of the reflector 401 is located on a straight line connecting the light-emitting surface of the light source and the apex of the four-sided pyramid 131 as illustrated in FIG. 18 so that the reflector 401 reflects the same amount of light as the four-sided pyramid 131 to irradiate the group of optical sheets 102 and 103 with the light.

Figure 19:
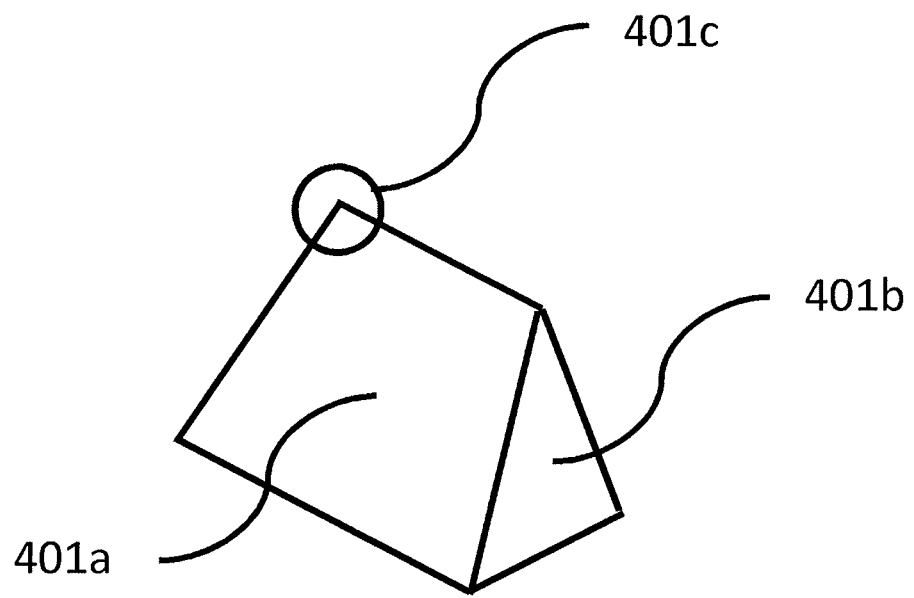
FIG. 19 is a schematic view of one reflector 401.

The reflectors 401 are preferably arranged at such positions that the center 401g of the reflector 401 is located on a line connecting the light source 111 and a midpoint 131h of the central points 131g of the bottom surfaces of the adjacent four-sided pyramids 131. FIG. 19 illustrates an example of the reflector 401. When the reflector 401 has a rectangular (oblong) bottom surface, a trapezoidal surface 401a, and a triangular surface 401b, the angle between the surface 401a and the bottom surface of the backlight is preferably approximately the same as the angle between the side surface and the bottom surface of the four-sided pyramid 131.

Although acute-angled portions 401c of the reflector 401 may have a round shape due to manufacturing reasons, the portions preferably have a substantially acute-angled shape so that the reflector 401 reflects a larger amount of light from the light source.

Moreover, the surface 401a preferably has a trapezoidal shape of which the lower side is longer than the upper side or a rectangular shape of which the upper and lower sides have the same length.

Figure 20:
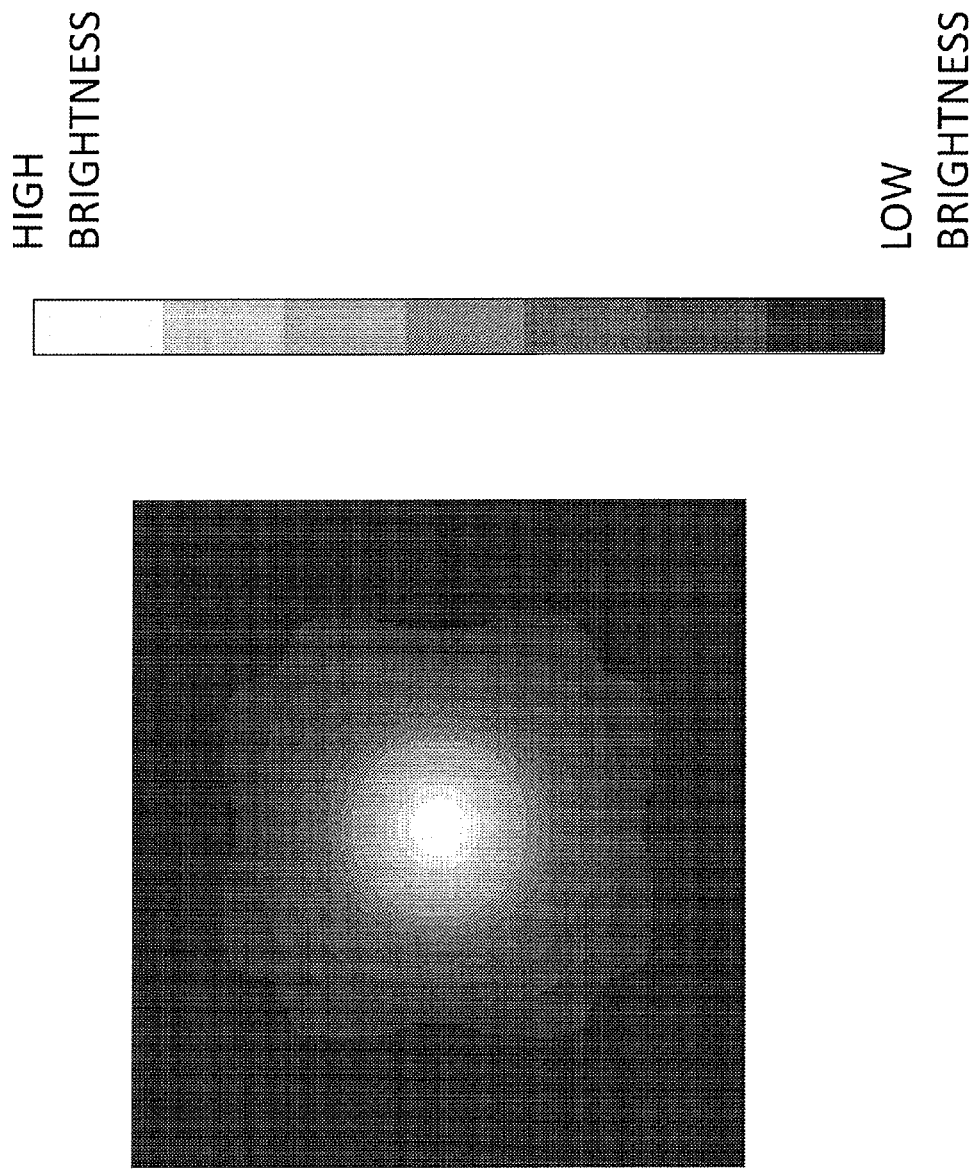
FIG. 20 illustrates a brightness distribution when only one light source 111 is lit in the structure of a fourth embodiment.

For example, when the reflectors 401 are added to the structure of the first embodiment, the height of the reflector 401 is determined to 5.5 mm. The lengths of the lower and upper sides of the surface 401a are set to 5 mm and 4 mm, respectively so that the bottom surface of the reflector 401 does not make contact with other reflectors and four-sided pyramids. FIG. 20 illustrates a brightness distribution and a light spreading pattern when only one light source 111 is lit in this structure. The light spreading pattern is close to the cross-shape in the structure of the first embodiment as illustrated in FIG. 16 whereas the light spreading pattern has a tetragonal shape in the structure of the fourth embodiment and is nearly uniform in respective directions.

As described above, according to the fourth embodiment, since the reflector 401 that reflects light from the light source 111 is also disposed between the adjacent four-sided pyramids 131, the light from the light source 111 is suppressed from leaking through the gap between the adjacent four-sided pyramids 131. As a result, since the light spreading pattern when only one light source is lit becomes approximately uniform in all directions, it is possible to further increase the brightness uniformity, reduce the interferences when the local dimming control is performed, and further improve the contrast ratio.

Fifth Embodiment

Hereinafter, a backlight device according to a fifth embodiment of the present invention will be described.

In the present embodiment, a configuration which can make the light spreading pattern more uniform in respective directions than the fourth embodiment will be described.

The same members as those of the first, second, and fourth embodiments will be denoted by the same reference numerals, and the description thereof will not be provided.

In the fifth embodiment, a case where the reflectors described in the fourth embodiment are added to the structure of the second embodiment will be described. Even when the four-sided pyramids 131 of which the lower side surface of the four-sided pyramid has the curved surface 201, as in the second embodiment, by arranging the reflectors 401 of the fourth embodiment, it is possible to improve the brightness uniformity similarly to the fourth embodiment. However, by forming the surface 401a of the reflector 401 as a curved surface, it is possible to further improve the brightness uniformity.

Figure 21:
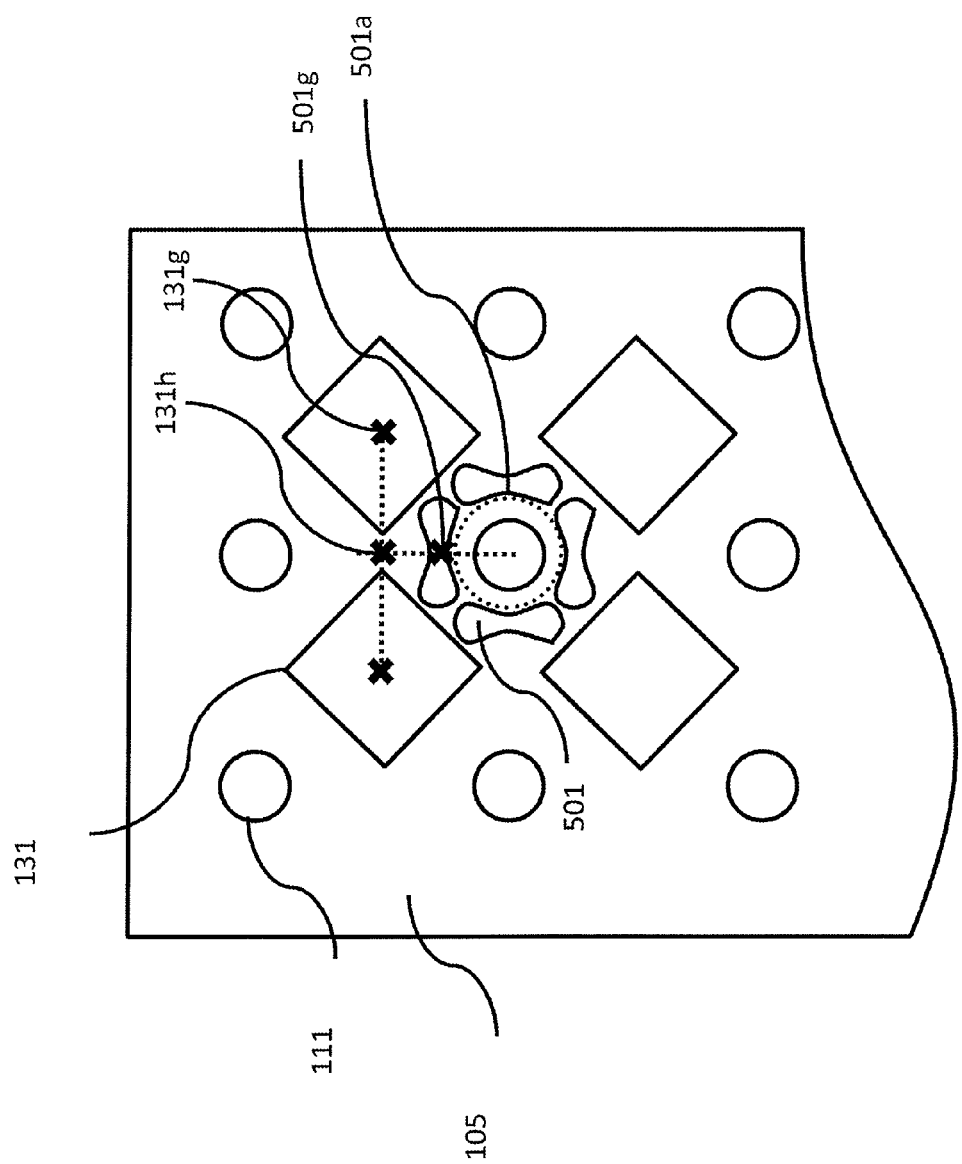
FIG. 21 is a front view of a backlight device, illustrating an arrangement position of reflectors 501.
Figure 22:
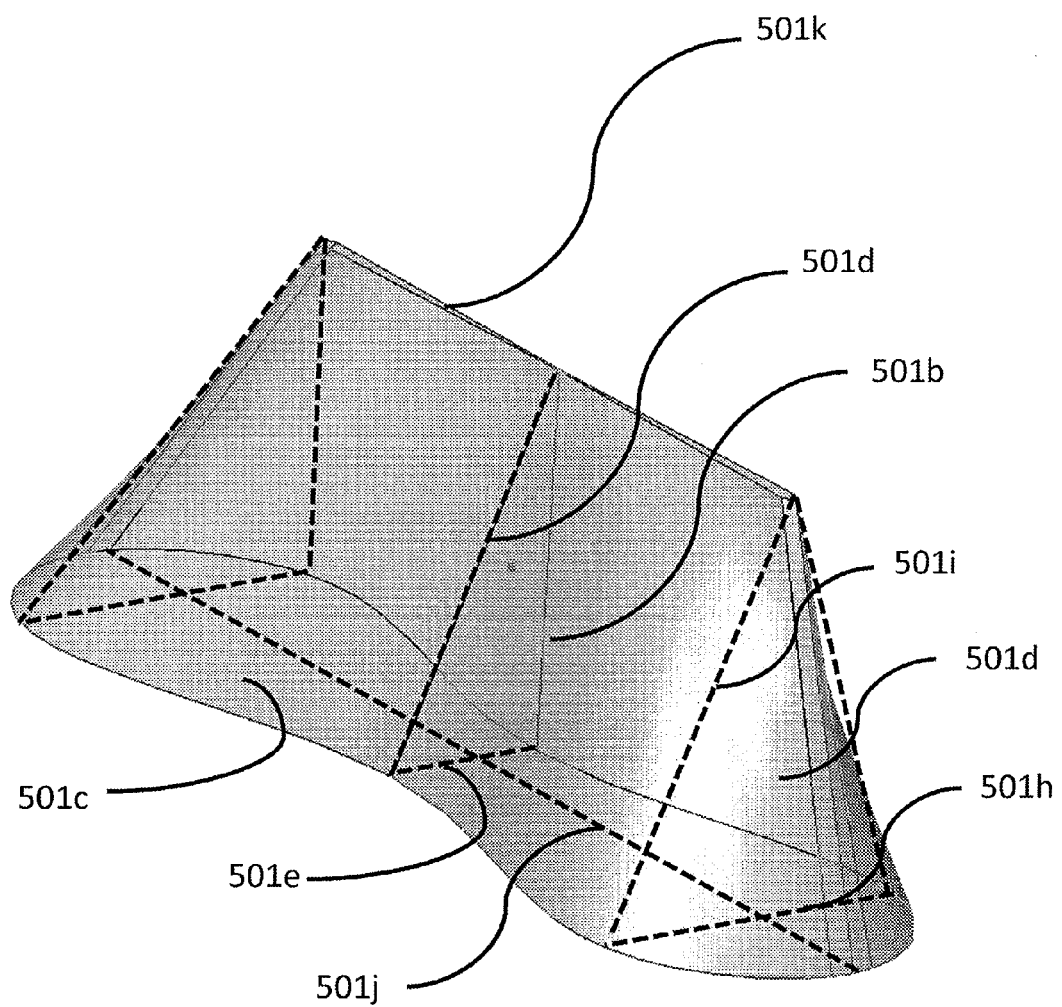
FIG. 22 is a schematic view of one reflector 501.

FIG. 21 is a front view of a backlight device in which reflectors 501 are added to the structure of the second embodiment. In FIG. 21, similarly to the fourth embodiment, the center 501g of the reflector 501 is located on a line connecting the light source 111 and a midpoint 131h of the central points 131g of the bottom surfaces of the adjacent four-sided pyramids 131. The reflectors 501 are separated from each other so that light from the light source 111 reaches the four-sided pyramids 131. FIG. 22 illustrates an example of the reflector 501. The shape of a bottom surface 501c of the reflector 501 is determined such that a curved line of a portion of the bottom surface 501c facing the light source 111 forms an arc of an imaginary circle 501a (depicted by a broken line) surrounding the light source 111. Due to this, the curved lines of the portions facing the light source 111, of the bottom surfaces 501c of the four reflectors 501 that surround the light source 111 have approximately the same shape as the imaginary circle 501a as a whole. Thus, a curved line of a lower portion (a portion of the side surface close to the bottom surface) of a surface 501b of the reflector 501 forms the imaginary circle 501a.

Moreover, the reflectors 501 are arranged such that the curved surfaces 501b face the light source 111. The reflectors 501 are separated from each other (are independent members) and are arranged so that the bottom surfaces 501c form the circle 501a. The length in the lateral direction of the bottom surface 501c of the reflector 501 is the longest (indicated by a segment 501h) near both ends of a portion having the same shape as the arc of the circle 501a and is the shortest (indicated by a segment 501e) near a central portion in the longitudinal direction. Moreover, the angle between the bottom surface and a surface 501d (the angle between the segment 501h and a segment 501i) is preferably the same as the angle between the bottom surface and the side surface of the four-sided pyramid 131 near both ends of the portion having the same shape as the arc of the circle 501a. Although the surface 501d may have an optional shape, the surface 501d preferably has the same curved surface as FIG. 22 in order to improve diffusibility.

Figure 23:
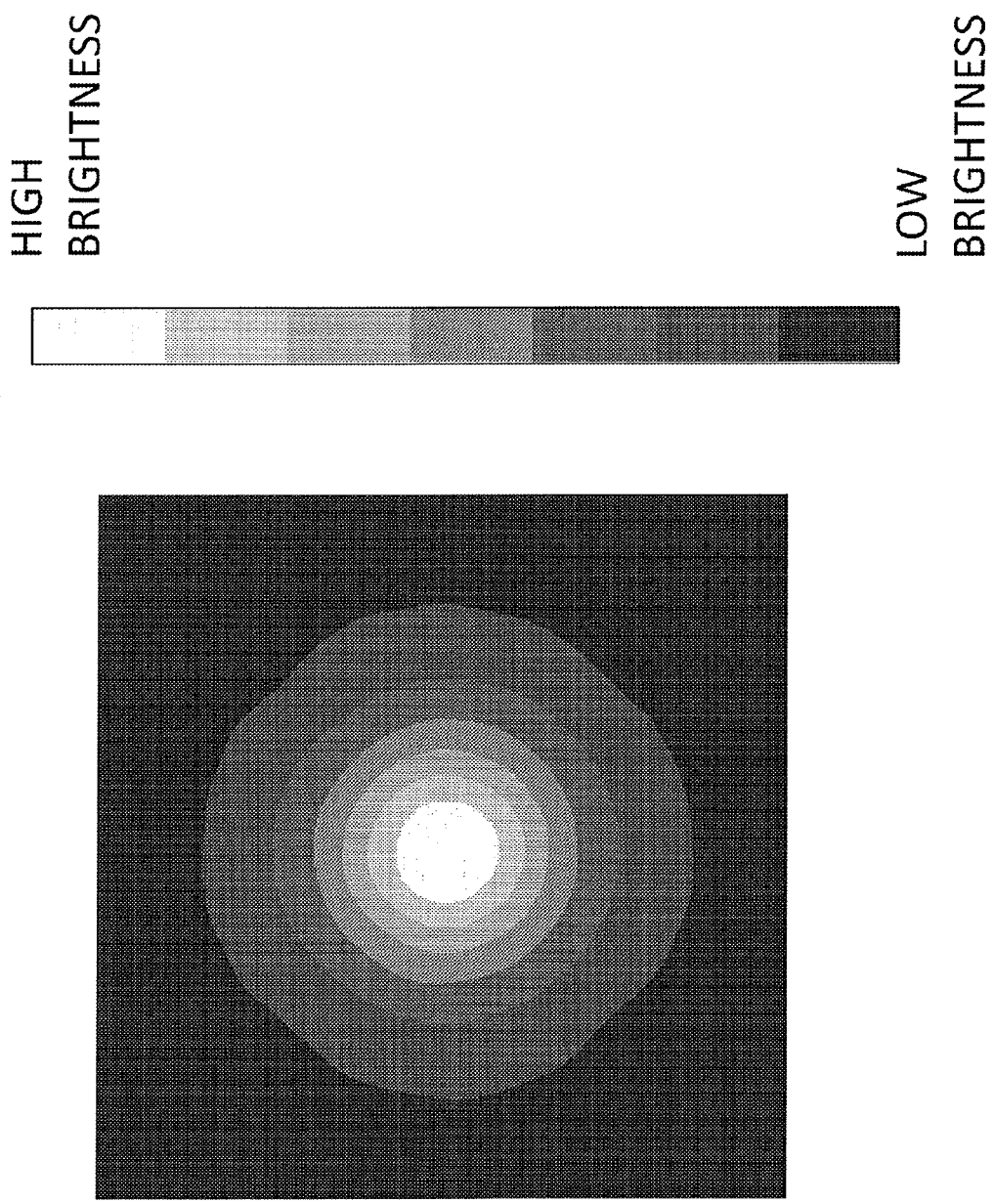
FIG. 23 illustrates a brightness distribution when only one light source 111 is lit in the structure of a fifth embodiment.

For example, when the reflectors 501 are added to the structure of the second embodiment, the height of the reflector 501 is determined to 5.5 mm. The length (depicted by a segment 501j) in the longitudinal direction of the bottom surface 501c is set to 5 mm so that the bottom surface of the reflector 501 does not make contact with other reflectors 501 and four-sided pyramids 131. Moreover, the length of a side 501k of the apex of the surface 501d is set to 4 mm. Further, the lengths of the shortest portion (the segment 501e) and the longest portion (the segment 501h) in the lateral direction of the bottom surface 501c are set to 2 mm and 4 mm, respectively, and the bottom surfaces 501c of the four reflectors 501 surrounding the light source 111 are decided to form the circle 501a as a whole as described above. FIG. 23 illustrates a brightness distribution and a light spreading pattern when only one light source 111 is lit in this structure. The light spreading pattern is close to the tetragonal shape in the structure of the fourth embodiment whereas the light spreading pattern has an approximately circular shape in the structure of the fifth embodiment and is more uniform in respective directions.

As described above, according to the fifth embodiment, since the reflector 501 that reflects light from the light source 111 is also disposed between the adjacent four-sided pyramids 131 and the lower portions of the side surface of the reflector 501 and the side surface of the four-sided pyramid 131 have a curved surface, the light spreading pattern when only one light source is lit becomes approximately uniform. As a result, it is possible to further increase the brightness uniformity, reduce the interferences when the local dimming control is performed, and further improve the contrast ratio.

The reflectors 501 of the fifth embodiment may be added to the structure of the first embodiment, and the reflectors 401 of the fourth embodiment may be added to the structure of the second embodiment. Moreover, the reflectors 401 of the fourth embodiment or the reflectors 501 of the fifth embodiment may be added to the structure of the third embodiment. In any case, the light from the light source 111 is suppressed from leaking through the gap between the adjacent four-sided pyramids 131, the light spreading pattern when only one light source is lit becomes approximately uniform in all directions, and the brightness uniformity is increased further.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-102245, filed on May 14, 2013, and Japanese Patent Application No. 2014-084941, filed on Apr. 16, 2014, which are hereby incorporated by reference herein in their entirety.

What is claimed is:

1. A light-emitting device comprising:
   a first planar member in which a plurality of light sources are placed;
   a second planar member which is provided approximately in parallel to the first planar member and which is irradiated with light from the plurality of light sources; and
   a first reflecting member which is provided on an inner side of a polygon defined by the plurality of light sources of the first planar member as vertices thereof, and which reflects light beams from the respective light sources to the second planar member, wherein
   a shape of the first reflecting member satisfies at least one of:
   a first condition under which the shape is a polygonal pyramid, the bottom surface of which is approximately parallel to the first planar member, and a diffusion distance which is a distance between the first planar member and the second planar member is in a range of 0.8 and 1.3 when a length of each side of a polygon of the bottom surface of the polygonal pyramid is 1; and
   a second condition under which the shape is a polygonal pyramid, the bottom surface of which is approximately parallel to the first planar member, and an angle between a side surface of the polygonal pyramid and the bottom surface is in a range of 40 degree and 60 degree.

2. The light-emitting device according to claim 1, wherein the distance between the first planar member and the second planar member is smaller than an interval between the light sources on the first planar member.

3. The light-emitting device according to claim 1, wherein the first reflecting member is placed at the center of the polygon.

4. The light-emitting device according to claim 1, wherein the diffusion distance is 1.1 when the length of each side of the polygon of the bottom surface of the polygonal pyramid is 1.

5. The light-emitting device according to claim 1, wherein the angle between the side surface and the bottom surface of the polygonal pyramid is 55 degree.

6. The light-emitting device according to claim 1, wherein a portion of the side surface of the polygonal pyramid close to the bottom surface has a curved surface that is convex to the first planar member.

7. The light-emitting device according to claim 6, wherein the shape of the curved surface is a portion of a surface of a cylinder which is touched by the first planar member and the side surface, and the central axis of which is parallel to the first planar member.

8. The light-emitting device according to claim 1, further comprising:
a support member formed on the first planar member so as to support the second planar member, wherein
a portion of the support member is disposed inside the first reflecting member.

9. The light-emitting device according to claim 1, further comprising:
a support member disposed at an apex portion of the polygonal pyramid so as to support the second planar member.

10. The light-emitting device according to claim 1, wherein the light sources are arranged so that lines connecting adjacent four light sources form a square, and
the first reflecting member is a four-sided pyramid which is disposed at the center of a square that is formed by connecting adjacent four light sources, and the bottom surface of which is a square.

11. The light-emitting device according to claim 10, wherein
respective sides of the square of the bottom surface is parallel or vertical to diagonals of the square formed by connecting the adjacent four light sources.

12. The light-emitting device according to claim 1, wherein a plurality of first reflecting members are provided on the first planar member,
the plurality of first reflecting members are arranged so that the light source is positioned on an inner side of a polygon defined by the plurality of first reflecting members as vertices thereof, and
a second reflecting member which is provided at a position between the position of the light source and the position between adjacent two first reflecting members so as to reflect light from the light source toward the second planar member is provided on the inner side of the polygon defined by the plurality of first reflecting members surrounding the light source as vertices thereof.

13. The light-emitting device according to claim 12, wherein
a plurality of second reflecting members are provided on the inner side of the polygon defined by the plurality of first reflecting members surrounding the light source as vertices thereof.

14. The light-emitting device according to claim 13, wherein
a plurality of the second reflecting members are arranged so that the light source is positioned on an inner side of a polygon defined by the plurality of second reflecting members as vertices thereof.

15. The light-emitting device according to claim 13, wherein
a plurality of the second reflecting members are arranged so that the light source is positioned at a center of a polygon defined by the plurality of second reflecting members as vertices thereof.

16. The light-emitting device according to claim 13, the polygon defined by the plurality of first reflecting member as vertices thereof, and the polygon defined by the plurality of second reflecting member as vertices thereof, have the same number of vertices.

17. The light-emitting device according to claim 12, wherein
at least one of sides that form a bottom surface of the second reflecting member faces the light source surrounded by the polygon.

18. The light-emitting device according to claim 12, wherein
a height of the second reflecting member is less than a height of the first reflecting member.

19. The light-emitting device according to claim 12, wherein
an apex of the second reflecting member is located on a line connecting the light source and an apex of the first reflecting member.

20. The light-emitting device according to claim 12, wherein
an angle between a side surface and a bottom surface of the second reflecting member facing the light source is the same as an angle between a side surface and a bottom surface of the polygonal pyramid of the first reflecting member.

21. The light-emitting device according to claim 12, wherein
the second reflecting member has a rectangular bottom surface, a rectangular or trapezoidal side surface, and a triangular side surface, and the rectangular or trapezoidal side surface faces the light source.

22. The light-emitting device according to claim 12, wherein
a portion of a bottom surface of the second reflecting member facing the light source is a curved line that is concave to the light source.

23. The light-emitting device according to claim 22, wherein
the curved line is an arc of a circle that surrounds the light source.

24. A light-emitting device comprising:
a first planar member in which a plurality of light sources are placed;
a second planar member which is provided approximately in parallel to the first planar member and which is irradiated with light from the plurality of light sources; and
a first reflecting member which is provided on an inner side of a polygon which is defined by the light sources of the first planar member as vertices thereof, and which reflects light beams from the respective light sources to the second planar member, wherein
the first reflecting member has a polygonal pyramidal shape, the bottom surface of which is approximately parallel to the first planar member, and
a plurality of sides that form the bottom surface of the first reflecting member face the plurality of light sources respectively.

25. The light-emitting device according to claim 24, wherein
the first reflecting member has a four-sided pyramidal shape, and
four sides that form a square of the bottom surface of the first reflecting member face four light sources respectively.

26. The light-emitting device according to claim 25, wherein diagonals of a square that connects the four light sources are parallel or vertical to respective four sides that form the square of the bottom surface of the first reflecting member.

27. The light-emitting device according to claim 24, wherein
the distance between the first planar member and the second planar member is smaller than an interval between the light sources on the first planar member.

28. The light-emitting device according to claim 24, wherein
the first reflecting member is placed at the center of the polygon.

29. The light-emitting device according to claim 24, further comprising:
a support member formed on the first planar member so as to support the second planar member, wherein
a portion of the support member is disposed inside the first reflecting member.

30. The light-emitting device according to claim 24, further comprising:
a support member disposed at an apex portion of the polygonal pyramid so as to support the second planar member.

31. The light-emitting device according to claim 24, wherein
the light sources are arranged so that lines connecting the light sources form a square, and
the first reflecting member is a four-sided pyramid which is disposed at the center of a square that is formed by connecting adjacent four light sources, and the bottom surface of which is a square.

32. The light-emitting device according to claim 1, wherein
the first planar member is a light source substrate on which the light sources are arranged.

33. The light-emitting device according to claim 1, wherein
a reflecting sheet that reflects light from the light source is formed on a surface of the first planar member facing the second planar member.

34. The light-emitting device according to claim 1, wherein
the second planar member includes at least any of a polarizing film, a light condensing sheet, and a diffuser.

35. The light-emitting device according to claim 1, wherein the light source is an LED.

36. A backlight device of an image display apparatus, comprising the light-emitting device according to claim 1.

37. An image display apparatus comprising:
the backlight device according to claim 16; and
a display panel which is irradiated with light by the backlight device.

* * * * *